(12) United States Patent
Ito et al.

(10) Patent No.: US 7,383,138 B2
(45) Date of Patent: Jun. 3, 2008

(54) SEMICONDUCTOR DEVICE

(75) Inventors: Takayasu Ito, Tokyo (JP); Mitsuru Hiraki, Tokyo (JP); Masashi Horiguchi, Tokyo (JP); Toyohiro Shimogawa, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 193 days.

(21) Appl. No.: 11/401,977

(22) Filed: Apr. 12, 2006

(65) Prior Publication Data

US 2006/0235630 A1 Oct. 19, 2006

(30) Foreign Application Priority Data

Apr. 15, 2005 (JP) ............................. 2005-118290

(51) Int. Cl.
*G01R 21/00* (2006.01)
(52) U.S. Cl. ......................................................... 702/60
(58) Field of Classification Search .................... 702/60
See application file for complete search history.

(56) References Cited

U.S. PATENT DOCUMENTS 6,092,207 A * 7/2000 Kolinski et al. ............ 713/323

| | | | |
|---|---|---|---|
| 6,857,093 B2 * | 2/2005 | Ooishi | 714/733 |
| 2005/0185450 A1 * | 8/2005 | Isoda et al. | 365/154 |
| 2007/0145922 A1 * | 6/2007 | Ito et al. | 318/300 |
| 2007/0273345 A1 * | 11/2007 | Chen et al. | 323/271 |

FOREIGN PATENT DOCUMENTS

| JP | 2003-32399 | | 1/2003 |
|---|---|---|---|
| JP | 2003-032399 | * | 1/2003 |

* cited by examiner

*Primary Examiner*—John Barlow
*Assistant Examiner*—Cindy D. Khuu
(74) *Attorney, Agent, or Firm*—Miles & Stockbridge PC

(57) ABSTRACT

A semiconductor device includes: a power switch connecting an internal power supply in which power is not shut down and an internal power supply in which power is shut down; and an internal voltage determining circuit for determining voltage of the internal power supply in which power is shut down. Voltage of the internal power supply in which power is shut down is generated from external power supply voltage by using a regulator circuit. When the power of the internal power supply is interrupted, the power switch is turned off, the regulator circuit is turned off, and an output of the regulator circuit is shorted to a ground potential. When power of the internal power supply is resumed, the regulator circuit is turned on, shorting is cancelled, increased voltage of the internal power supply is determined, operation of a circuit block is started, and the switch is turned on.

16 Claims, 27 Drawing Sheets

FIG. 6

| MODE | Vext | Vint0 | Vint1 | SW0 | VREG | STBY_VREG | Vint1 Short | CPU | RAM |
|---|---|---|---|---|---|---|---|---|---|
| OFF | GND | * | * | * | OFF | OFF | OFF | Stop | Stop |
| RESET | Vext | Vint | Vint | ON | ON | ON | OFF | RST | RST |
| NORMAL | Vext | Vint | Vint | ON | ON | ON | OFF | Active | Active |
| STANDBY | Vext | Vint | Vint | ON | OFF | ON | OFF | STBY | STBY |
| RAM_HOLD | Vext | Vint | GND | OFF | OFF | ON | ON | Stop | STBY |

FIG. 11
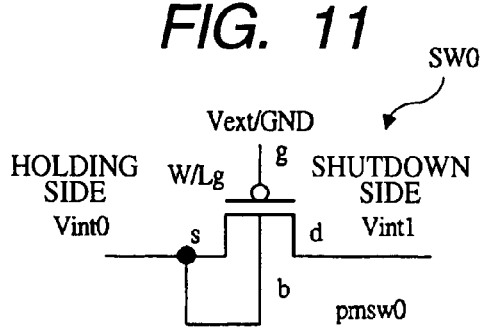
FIG. 12
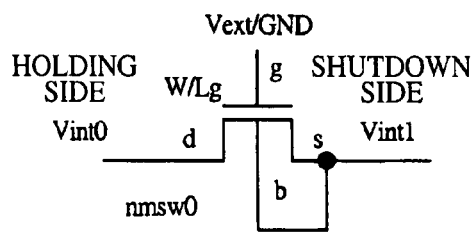 W SIZE < 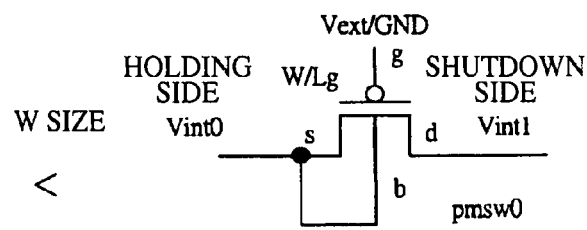
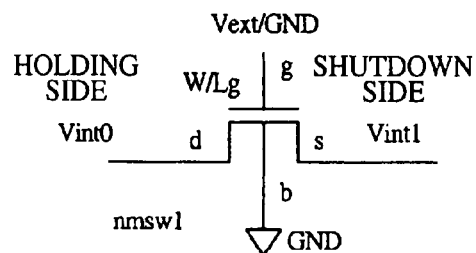 W SIZE < 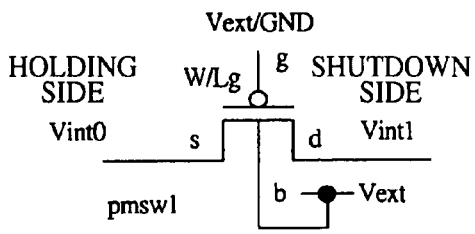

FIG. 18

| MODE | Vext | Vint0 | Vint1 | SW0 | VREG0,1 | STBY_VREG | Vint1 Short | CPU | RAM | NVM |
|---|---|---|---|---|---|---|---|---|---|---|
| OFF | GND | * | * | * | OFF | OFF | OFF | Stop | Stop | Stop |
| RESET | Vext | Vint | Vint | ON | ON | ON | OFF | RST | RST | Read |
| NORMAL | Vext | Vint | Vint | ON | ON | ON | OFF | Active | Active | Active |
| STANDBY1 | Vext | Vint | Hiz | OFF | OFF | ON | OFF | STBY | STBY | Stop |
| STANDBY2 | Vext | Vint | GND | OFF | OFF | ON | ON | STBY | STBY | Stop |

FIG. 20

| MODE | Vext | Vint0 | Vint1 | Vint2 | SW0 | SW1 | VREG1,2 | STBY_VREG | Vint1,2 Short | CPU | RAM | NVM |
|---|---|---|---|---|---|---|---|---|---|---|---|---|
| OFF | GND | * | * | * | * | * | OFF | OFF | OFF | Stop | Stop | Stop |
| RESET | Vext | Vint | Vint | Vint | ON | ON | ON | ON | OFF | RST | RST | Read |
| NORMAL | Vext | Vint | Vint | Vint | ON | ON | ON | ON | OFF | Active | Active | Active |
| STANDBY | Vext | Vint | Vint | Vint | ON | OFF | OFF | ON | OFF | STBY | STBY | STBY |
| STANDBY1 | Vext | Vint | Vint | Hiz | ON | OFF | OFF | ON | OFF | STBY | STBY | STBY |
| RAM_HOLD | Vext | Vint | GND | GND | OFF | OFF | OFF | ON | ON | Stop | STBY | Stop |

FIG. 22

| MODE | Vext | Vint0 | Vint1 | Vint2 | SW0 | SW1 | VREG | STBY_VREG0 | STBY_VREG1 | Vint1 Short | Vint2 Short | CPU | RAM | LU |
|---|---|---|---|---|---|---|---|---|---|---|---|---|---|---|
| OFF | GND | * | * | * | * | * | OFF | OFF | OFF | OFF | OFF | Stop | Stop | Stop |
| RESET | Vext | Vint | Vint | Vint | ON | ON | ON | ON | ON | OFF | OFF | RST | RST | RST |
| NORMAL | Vext | Vint | Vint | Vint | ON | ON | ON | ON | ON | OFF | OFF | Active | Active | Active |
| STANDBY | Vext | Vint | Vint | Vint | ON | ON | OFF | OFF | ON | OFF | OFF | STBY | STBY | STBY |
| RAM_HOLD | Vext | Vint | GND | Vint | OFF | OFF | OFF | OFF | ON | ON | OFF | Stop | STBY | STBY |
| LU_HOLD | Vext | Vint | GND | GND | OFF | ON | ON | OFF | OFF | ON | ON | Stop | Stop | STBY |

*FIG. 28*

| MODE | Vext | Vint0 | Vint1 | VREG0 | VREG1 | STBY_VREG0 | STBY_VREG1 | Vint1 Short | CPU | RAM |
|---|---|---|---|---|---|---|---|---|---|---|
| OFF | GND | * | * | OFF | OFF | OFF | OFF | OFF | Stop | Stop |
| RESET | Vext | Vint | Vint | ON | ON | ON | ON | OFF | RST | RST |
| NORMAL | Vext | Vint | Vint | ON | ON | ON | ON | OFF | Active | Active |
| STANDBY | Vext | Vint | Vint | OFF | OFF | ON | ON | OFF | STBY | STBY |
| RAM_HOLD | Vext | Vint | GND | OFF | OFF | ON | OFF | ON | Stop | STBY |

SEMICONDUCTOR DEVICE

CROSS-REFERENCE TO RELATED APPLICATION

The present application claims priority from Japanese patent application No. 2005-118290 filed on Apr. 15, 2005, the content of which is hereby incorporated by reference into this application.

BACKGROUND OF THE INVENTION

The present invention relates to a semiconductor device and, more particularly, to a technique effectively applied to a semiconductor device such as a microcomputer or a system LSI having a power shutoff function for reduction in power consumption.

For example, Japanese Unexamined Patent Publication No. 2003-032399 discloses an image processor having a selection switch capable of switching a power to be supplied to a volatile memory between a main power supply or a standby power supply, and means for controlling the selection switch. The means for controlling the selection switch includes a main power supply level detector for detecting a voltage drop accompanying stop of the main power supply and switching the selection switch to the standby power supply side. With the configuration, in a state where image data is held in the volatile memory, the image processor can shift to a low-power standby mode without dissipating the image data.

SUMMARY OF THE INVENTION

The inventors herein have studied the technique for lowering power consumption of a semiconductor device as described above and found the following.

As a semiconductor device is becoming finer in recent years, the voltage of a semiconductor device is becoming lower. In a semiconductor device that operates on such a low voltage, the threshold voltage of a transistor has to be decreased in order to realize high-speed operation. However, as the threshold voltage decreases, a leak current (sub-threshold current) increases in a state where the transistor is off. Consequently, increase in power consumption in the standby mode is becoming an issue.

For example, a semiconductor device such as a system LSI including a RAM block and a CPU block has a power saving mode, and a function of stopping power supply on a block unit basis in the power saving mode is necessary. Such a function is realized by, for example, a configuration as shown in FIG. 35. FIG. 35 is a block diagram showing an example of a schematic configuration of a semiconductor device studied as a precondition of the present invention.

A semiconductor device shown in FIG. 35 has, for example, a regulator circuit VREG and a standby regulator circuit STBY_VREG for generating an internal voltage Vint from an external voltage Vext, and two circuit blocks BLK0 and BLK1 to which the internal voltage Vint is supplied. The circuit block BLK0 corresponds to, for example, a RAM block or the like which has to always hold data and to which the internal voltage Vint is always supplied even in the power saving mode.

On the other hand, the circuit block BLK1 corresponds to, for example, a CPU block or the like. In the power saving mode, the power to the circuit block BLK1 is shut down by turning off switches SW1 and SW2 provided on the internal voltage Vint side and a ground potential (ground voltage, reference voltage) GND side. The switches SW1 and SW2 are turned on when the power saving mode is reset to a normal operation mode. In the power saving mode, for example, the regulator circuit VREG is stopped and the internal voltage Vint is generated only by the standby regulator circuit STBY_VREG. In the power saving mode, a power supplied as the internal voltage Vint can be also switched by a method described in Japanese Unexamined Patent Publication No. 2003-032399.

However, such a semiconductor device has, for example, the following problems.

First, in the circuit block BLK1 whose power is shut off, when the mode is reset to the normal operation mode after power shutoff, malfunction may occur due to unstableness of the power supply. Specifically, the timing at which the circuit block BLK1 actually starts operation in accordance with a reset command is generally specified by providing a simple analog or digital delay on the basis of a signal for switching the mode to the normal operation mode. The delay time is set as short as possible to make a reset promptly but does not always coincide with the time, which is necessary for the power supplied to BLK1, to reach a stable level, due to variations in use environments and the like.

Also in the circuit block BLK0 in which power supply is not shut off, malfunction may occur due to unstableness of the power supply at the time the circuit block BLK1 in which power was shut off is reset to the normal operation mode. Specifically, due to reduction in size of a semiconductor device or lowering of the voltage, the noise margin is also being reduced. By the turn-on of the switches SW1 and SW2 at the time of resetting, fluctuations in the internal voltage Vint occur. Consequently, there is the possibility that data stored in, for example, the RAM block in the circuit block BLK0 is destroyed.

Further, enlargement of the circuit area due to insertion of the switches SW1 and SW2 and the like is also concerned. A method of performing power shutoff by using only one of the switches SW1 and SW2 may be also considered. In the case of shutting off the power only on the switch SW2 side, designing of a new circuit for detecting or preventing malfunction, particularly, in a latch circuit in a circuit to be shut off, design change of an existing circuit, and the like may be required.

An object of the present invention is to realize improvement in power saving and reliability of a semiconductor device. Another object of the present invention is to realize reduction in the area of a semiconductor device.

The above and other objects and novel features of the present invention will become apparent from the description of the specification and the appended drawings.

Outline of representative ones of inventions disclosed in the application will be briefly described as follows.

A semiconductor device of the present invention has a power supply line (second power supply line) which is interrupted, a power supply line (first power supply line) which is not interrupted, and a voltage determination circuit for determining voltage level of the power supply line which is interrupted. With the configuration, when the interrupted power supply line is reset, after the voltage level of the power supply line is determined, operations of a circuit block connected to the power supply line can be restarted. Thus, without fear of malfunction, reliability improves.

A semiconductor device of the present invention has a plurality of power supply lines. In a configuration that at least one of the power supply lines can be interrupted, the power supply line which can be interrupted is driven by a regulator circuit. In such a configuration, the power supply is interrupted by stopping the regulator circuit (by making an output open) or fixing an output to the ground potential (ground voltage, reference source voltage). Consequently, the switch on the source voltage side and the switch on the ground potential side which are used in the conventional technique become unnecessary, so that the area can be reduced.

In this case, the semiconductor device may further include a voltage determining circuit for determining voltage level of a power supply line to be interrupted. On the basis of a determination result, a circuit block connected to the power supply line is enabled. In such a manner, as described above, malfunction in the circuit block can be prevented and reliability improves. By further providing the configuration with a power switch for connecting a plurality of power lines, the number of regulator circuits can be reduced and reliability of circuit operations can be improved.

Specifically, for example, in a case such that a standby regulator circuit for supplying power in a power saving mode, by turning on the power switch, the standby regulator circuit can be shared by the plurality of power supply lines. In some cases, a voltage determining circuit can be also shared. Also in a normal operation mode, by providing the power switch, the potentials of the power supply lines become the same with high precision. Thus, reliability of operations in the circuits improves.

In the case of such a configuration, at the time of interrupting a certain power supply line, it is necessary to turn off a desired power switch related to the power supply line. First, after turning off the power switch, the regulator circuit for interrupting power supply is turned off, and an output is grounded, so that voltage fluctuations in the power supply lines connected to each other by the power switch can be prevented and reliability improves. On the other hand, at the time of resetting the interrupted power supply line, first, the regulator circuit is started. After confirmation of rise in the voltage of the regulator circuit by the voltage determining circuit, the power switch is turned on. Simultaneously, the circuit block connected to the interrupted power supply line is enabled By such a sequence, voltage fluctuations in the interrupted power supply line and a power supply line connected by the power switch can be prevented. In addition, the circuit block connected to the interrupted power supply line can be operated without malfunction. Therefore, reliability can be improved.

Effects obtained by the representative ones of the inventions disclosed in the application will be briefly described. Power saving and improvement in reliability of the semiconductor device can be realized and reduction in the area of the semiconductor device can be realized.

BRIEF DESCRIPTION OF THE DRAWINGS

FIG. 6 is a table showing an example of the correspondence relation between the internal modes of the semiconductor device of FIG. 4 and operation states of internal circuits.

FIG. 11 is a circuit diagram showing an example of the configuration of a power switch in the semiconductor device of FIG. 4.

FIG. 12 is a diagram for comparison among various configuration examples of the power switch in the semiconductor device of FIG. 4.

FIG. 18 is a table showing an example of the correspondence relation between the internal modes of the semiconductor device of FIG. 17 and operation states of internal circuits.

FIG. 20 is a table showing an example of the correspondence relation between the internal modes of the semiconductor device of FIG. 19 and the operation states of internal circuits.

FIG. 22 is a table showing an example of the correspondence relation between the internal modes of the semiconductor device of FIG. 21 and the operation states of internal circuits.

FIG. 28 is a table showing an example of the correspondence relation between the internal modes of the semiconductor device of FIG. 27 and the operation states of internal circuits.

DETAILED DESCRIPTION OF THE PREFERRED EMBODIMENTS

Figure 1:
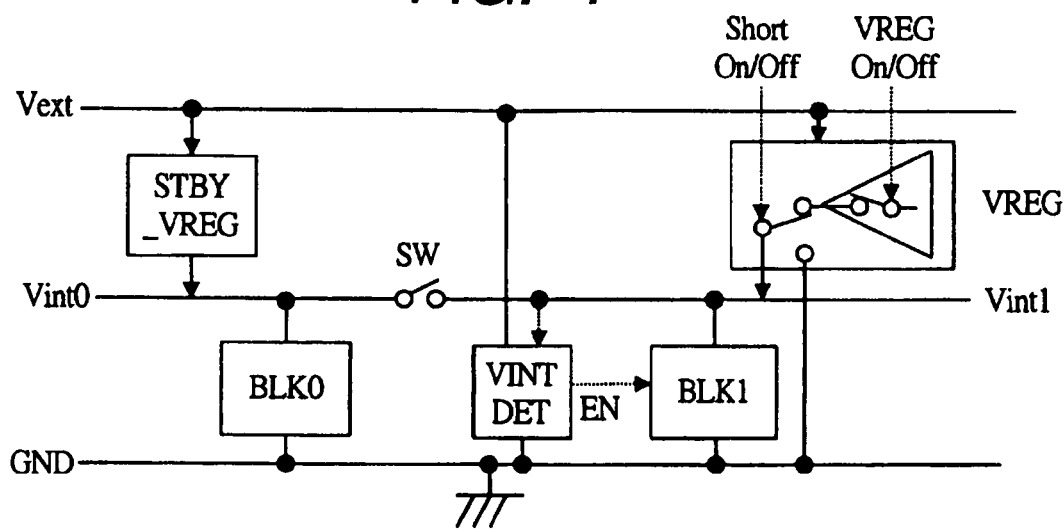
FIG. 1 is a block diagram showing an example of a schematic configuration of a semiconductor device according to an embodiment of the present invention.

Embodiments of the present invention will be described in detail hereinbelow with reference to the drawings. In all of the diagrams for explaining the embodiments, as a rule, the same reference numerals are designated to the same member and their repetitive description will not be given. Circuit devices constructing each of the function blocks of the embodiment are, although not limited, formed on a semiconductor substrate made of single crystal silicon or the like by an integrated circuit technique of a known CMOS (complementary MOS) transistor or the like.

In the diagrams, by giving a symbol of circle to the gate of a PMOS transistor, the PMOS transistor is distinguished from an NMOS transistor. In the diagrams, in a portion in which connection of a substrate potential of a MOS transistor is not shown, the connecting method is not particularly limited as long as the MOS transistor can operate normally.

Figure 2:
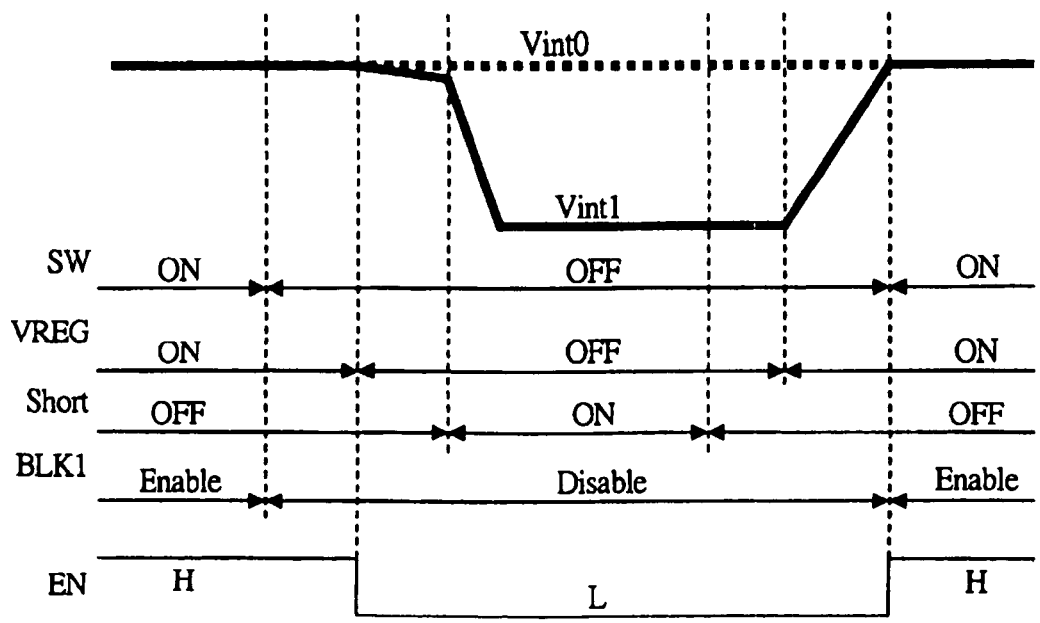
FIG. 2 is a diagram illustrating an example of sequences at the time of power shutoff and reset in the semiconductor device of FIG. 1.
Figure 3A:
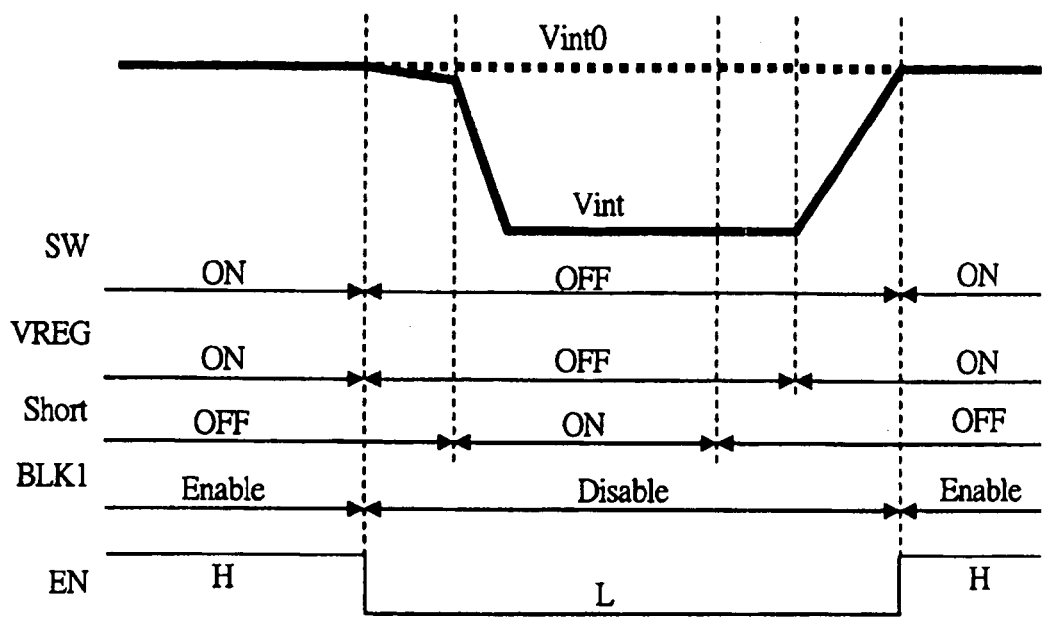
FIGS. 3A and 3B show an example of sequences in the semiconductor device of FIG. 1, which are different from the sequences of FIG. 2 and also different from each other.
Figure 3B:
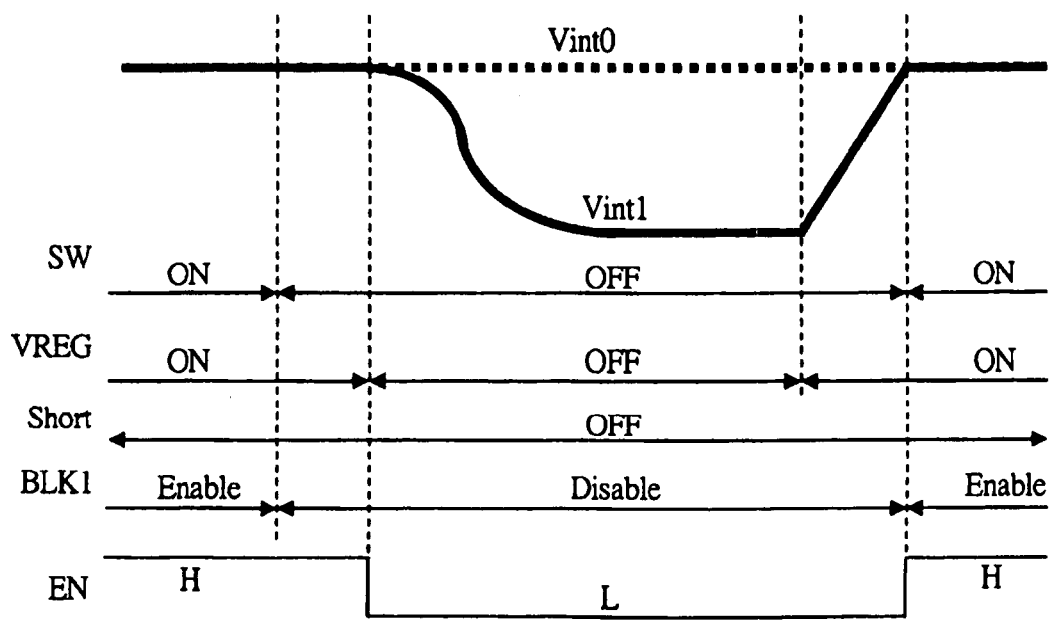

First, outline of main features of a semiconductor device according to the present invention will be described with reference to FIGS. 1 to 3. FIG. 1 is a block diagram showing an example of a schematic configuration of a semiconductor device according to an embodiment of the invention. FIG. 2 is a diagram illustrating an example of sequences at the time of power shutdown and at the time of reset in the semiconductor device of FIG. 1. FIGS. 3A and 3B are diagrams illustrating sequences which are different from those of FIG. 2 and are different from each other in the semiconductor device of FIG. 1.

The semiconductor device shown in FIG. 1 includes, for example, two circuit blocks BLK0 and BLK1, two regulator circuits (a first regulator circuit STBY_VREG and a second regulator circuit VREG), a power switch SW, and an internal voltage determining circuit VINTDET. The circuit block BLK0 is, for example, a RAM block to which power has to be supplied also in a power saving mode and is provided between an internal voltage (internal power supply line or internal source voltage) Vint0 and a ground potential (ground voltage, reference voltage, reference power supply line, or reference source voltage) GND. The circuit block BLK1 is, for example, a CPU block in which power is shutdown in the power saving mode and is provided between an internal voltage Vint1 and the ground voltage GND. A power switch SW is turned on/off, thereby selecting whether the internal power supply line Vint0 and the reference power supply line Vint1 are connected or not. The internal voltage Vint1 generated by the regulator circuit VREG and the internal voltage Vint0 generated by the standby regulator circuit STBY_VREG are set to be the same when the power switch SW is connected. The voltages Vint1 and Vint0 may be the same or different from each other when the power switch SW is not connected. The voltages Vint1 and Vint0 may be controlled individually.

The regulator circuit STBY_VREG is connected to the external voltage (external power supply line or external source voltage) Vext and the internal voltage Vint0 and generates the internal voltage Vint on the basis of the external voltage Vext. The regulator circuit STBY_VREG is designed so that power is saved by making the current supply capability lower than that in the regulator circuit VREG. The regulator circuit VREG is connected to the external voltage Vext and the internal voltage Vint1 and generates an internal voltage on the basis of the external voltage Vext. The regulator circuit VREG has a function of making its output voltage open (high impedance) and a function of connecting the output to the ground GND. The internal voltage determining circuit VINTDET operates on the external voltage Vext, is coupled to the internal power supply Vint1, and has the function of detecting the voltage of the internal power supply Vint1 on the side the power is shutdown, and has the function of detecting that the voltage of the internal power supply Vint1 is a predetermined voltage level or not, and outputting a control signal EN for enabling the circuit block BLK1 at the time of reset after power shutdown.

The semiconductor device has a normal operation mode (active mode) and a power saving mode (power down mode). For example, the normal operation mode is a mode in which the CPU block can execute a program. The power saving mode includes a mode in which part or all of circuits included in the circuit blocks BLK0 and BLK1 are temporarily stopped and a mode in which a clock frequency lower than the operation clock frequency supplied in the normal operation mode is supplied.

With such a configuration, the power shutdown and reset are performed by, for example, sequences as shown in FIG. 2. First, the power shutdown sequence will be described. On the basis of a mode switch signal of switching the normal operation mode to the power saving mode, the power switch SW is turned off as shown in FIG. 2. A stop signal is output to the circuit block BLK1 including the CPU to set the circuit block BLK1 to a stop state (disable state).

After that, the regulator circuit VREG is stopped (turned off). When the regulator circuit VREG stops, an output of the regulator circuit VREG becomes, for example, open and the voltage of the internal power supply Vint1 starts decreasing. A predetermined potential of the decreasing voltage is detected, and the output signal EN of the internal voltage determining circuit VINTDET shifts, for example, from the "H" level to the "L" level. Since the internal power supply Vint0 is isolated by the power switch SW, the potential remains held. After that, when the output short function of the regulator circuit VREG is turned on, an output of the regulator circuit VREG is shorted to the ground potential GND. Consequently, the voltage of the internal power supply Vint1 rapidly changes toward the voltage of the ground potential GND.

By such an operation, the semiconductor device completely enters the power saving mode. Specifically, in the circuit block BLK1, when power is shut down and the internal voltage Vint1 becomes the voltage of GND, a state in which no leak current occurs is obtained. On the other hand, the circuit block BLK0 is driven by the standby regulator circuit STBY_VREG of low power consumption and, for example, data stored in the RAM is held.

The sequence at the time of resetting will now be described. On the basis of a mode switching signal of switching the power saving mode to the normal operation mode or the like, as shown in FIG. 2, the short function of the regulator circuit VREG is turned off. That is, the state where the output of VREG is shorted to GND is canceled. After that, when the regulator circuit VREG is started, the voltage of the internal power supply Vint1 increases. When the voltage of the internal power supply Vint1 reaches a desired level and stabilized (that is, the internal circuit block receives the potential and reaches an internal potential at which normal operation can be performed), the level is detected and the output signal EN of the internal voltage determining circuit VINTDET shifts from the "L" level to the "H" level. By the shift to the "H" level of the output signal EN, the circuit block BLK1 is enabled and re-starts operating. The power switch SW is also turned on in response to the shift to the "H" level of the output signal EN, and the voltages of the internal power supplies Vint0 and Vint1 are shorted.

By such operations, the semiconductor device is completely reset to the normal operation mode. That is, the circuit blocks BLK1 and BLK0 are driven by the regulator circuits VREG and STBY_VREG. Outputs of the regulator circuits VREG and STBY_VREG are connected and operation voltages can be supplied from the internal power supplies Vint0 and Vint1 commonly connected by the switch SW.

The sequence of FIG. 2 can be changed to, for example, sequences as shown in FIGS. 3A and 3B. In the sequence of FIG. 3A, different from FIG. 2, the timing of turning off the power switch SW at the time of power shutdown, the timing of disabling the circuit block BLK1, and the timing of turning off the regulator circuit VREG are the same. When the sequence is used, the number of timings becomes smaller than that in FIG. 2, so that the control becomes easier. In the case of making the timing of turning off the regulator circuit VREG earlier than the timing of turning off the power switch SW, an excessive burden is placed on the standby regulator circuit STBY_VREG until the power switch SW is turned off, so that occurrence of malfunction is feared.

In the sequence of FIG. 3B, different from FIG. 2, an output of the regulator circuit VREG is not connected to the ground potential GND at the time of power shutdown. That is, power is shut down only by making the output open by turning off the regulator circuit VREG. Therefore, the voltage of the internal power supply Vint1 on the shutdown side gradually decreases, so that it takes some time until a complete power shutdown state in which no leak current occurs is obtained. However, the circuit area of the regulator circuit VREG can be reduced.

When the configurations and operations as described above are used, for example, the following effects are obtained.

(1) By providing the internal voltage determining circuit for the internal power supply line in which power is shutdown, that is, power supply is temporarily stopped, at the time of resetting of a circuit block in which the power is shut down, the voltage level of the power supply is actually determined and then the circuit block is enabled, so that malfunction does not occur. Thus, the reliability of the semiconductor device improves.

(2) By driving the internal power supply line in which power is shut down by the regulator circuit and shutting down the power by making an output of the regulator circuit open or connecting the output to the ground GND, switches on the power supply side and the GND side as described in the conventional art become unnecessary. Therefore, the area can be reduced.

(3) In the case of a configuration of stopping the internal voltage of a predetermined potential level (interruption of power supply) by the regulator circuit like the case (2), by providing a power switch between the internal power supply lines, reduction in the area and improvement of reliability can be realized. For example, a configuration similar to FIG. 1 except that there is no power switch SW and Vint0 and Vint1 are completely isolated from each other can be employed. In this case, however, each of the internal power supplies Vint0 and Vint1 has to be provided with a regulator circuit and a standby regulator circuit. Further, the potentials of the internal power supplies Vint0 and Vint1 do not always become the same with high precision.

By providing the power switch SW, the regulator circuit VREG, particularly, the standby regulator circuit STBY_VREG and the like can be commonly used by the internal power supply lines. Thus, the area can be reduced. Further, the potentials of the internal power supplies Vint0 and Vint1 can become the same with high precision, so that the reliability of the circuit operation improves. If there is an error between the internal power supplies Vint0 and Vint1, for example, a signal of a certain voltage level is input to a circuit and a signal having a voltage level slightly different from the certain voltage level is also input, output timings of the circuit are different from each other, and malfunction may be caused. By providing the power switch SW, such inconvenience can be prevented.

(4) In the case of a configuration such that the internal power supply is interrupted by a regulator circuit and the internal power supplies are connected by a power switch as in the case (3), it is preferable to provide an internal voltage determining circuit connected to an internal power supply line which is interrupted. At the time of resetting, malfunction in a circuit block in which power is shut down can be prevented and, in addition, malfunction in the other circuit blocks can be also prevented. Specifically, at the time of resetting, the voltage level of the reset internal power supply is actually determined by the internal voltage determining circuit and, after that, the power switch is turned on. By the operation, fluctuations in the voltage in the reset internal power supply and the internal power supply to be connected by the power switch can be prevented. Thus, reliability of the semiconductor device improves.

In the case where a single internal power supply which is not interrupted and a plurality of internal power supplies which are interrupted exist, a configuration as an application of the above-described configuration may be employed. For example, internal power supplies are connected by a power switch, a standby regulator circuit is connected to the internal power supply line which is not interrupted, and a regulator circuit and an internal voltage determining circuit are connected to each of the plurality of internal power supply lines which are interrupted.

Next, a more-detailed configuration example of the semiconductor device such as a system LSI or a microcomputer, including features as described above will be described hereinbelow.

Figure 4:
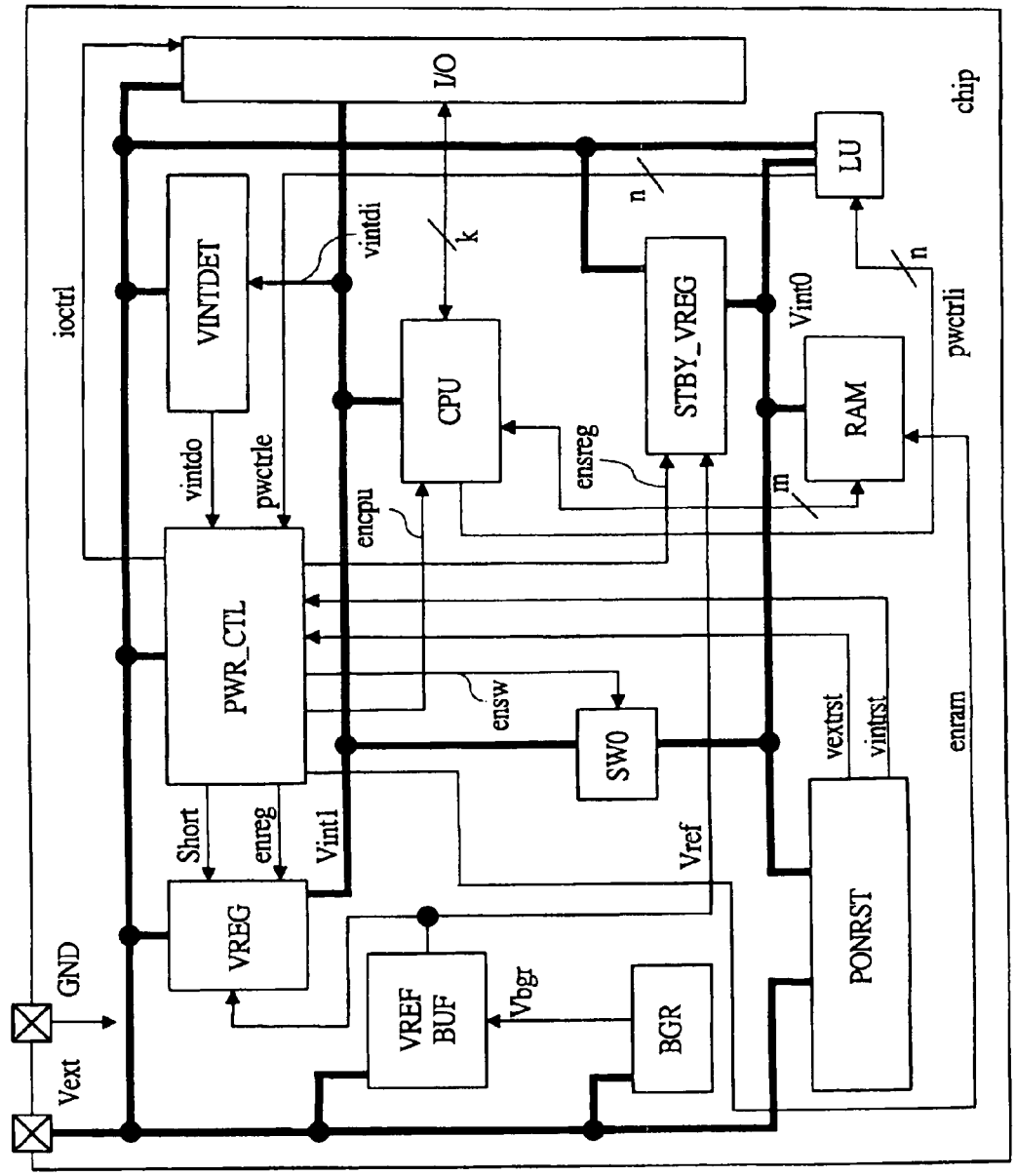
FIG. 4 is a block diagram showing an example of the configuration of a semiconductor device according to an embodiment of the invention.

FIG. 4 is a block diagram showing an example of the configuration of a semiconductor device as an embodiment of the invention. The semiconductor device has a configuration such that the voltage of the internal power supply Vint is divided to voltages of internal power supplies Vint0 and Vint1 of two systems and the voltage of the internal power supply Vint1 side is shut down. The configuration includes basic circuit blocks such as a central processing unit CPU connected to the internal power supply Vint, a volatile RAM connected to the internal power supply Vint0, and an input/output interface circuit I/O connected to the internal power supply Vint1 and an external power supply Vext. Built-in circuit blocks are not limited to the above circuits. Although not shown, a timer unit, an external communication interface circuit, and a data transfer control circuit connected to the internal power supply Vint1 may be included.

Peripheral circuit blocks other than the above circuit blocks are also included such as a reference voltage generating circuit BGR, an internal source voltage setting circuit VREFBUF, a regulator circuit VREG, a standby regulator circuit STBY_VREG, and an up-shifter (level shifter) LU. Further, as characteristic circuit blocks, the semiconductor device includes a power switch SW0 provided between Vint0 and Vint1, the internal voltage determining circuit VINTDET provided on the Vint1 side, a power-on reset circuit PONRST provided on the Vint0 side, and a power control circuit PWR_CTL.

The input/output interface circuit I/O transmits/receives a signal on the outside of the chip and an internal signal. The input/output interface circuit I/O is connected to, for example, a CPU via an internal signal line (internal bus) of k bits and has a level shifting function of converting a signal voltage and a function of latching input/output signals. With the arrangement, signals are transmitted/received with the voltage of the internal power supply Vint1 to/from the CPU, and signals are transmitted/received with the voltage of the external power supply Vext to/from the outside of the chip.

The regulator circuit VREG and the standby regulator circuit STBY_VREG generate the internal voltage Vint from the external supply voltage Vext on the basis of a set voltage applied from the reference voltage generating circuit BGR via the internal source voltage setting circuit VREFBUF. The standby regulator circuit STBY_VREG is designed to realize power saving greater than the regulator circuit VREG. To the up-shifter LU, power is supplied from the internal and external power supplies Vint0 and Vext. The up-shifter LU converts a power control signal pwctrli which is input with the internal supply voltage Vint from the CPU to a power control signal pwctrle of Vext and outputs the power control signal pwctrle to the power control circuit PWR_CTL. The up-shifter LU also has a function of latching input/output signals.

The internal voltage determining circuit VINTDET has functions as described with reference to FIG. 1. Specifically, the internal voltage determining circuit VINTDET detects fluctuations of the voltage of the internal power supply Vint1 and outputs a detection signal Vintdo to the power control circuit PWR_CTL. On the basis of the detection signal Vintdo, the power control circuit PWR_CTL outputs, for example, a CPU enable signal encpu, an enable signal ensw for the power switch SW0, and the like.

The power control circuit PWR_CTR generates, in addition, a control signal ioctrl for the I/O, an enable signal enram for the RAM, enable signals enreg and ensreg for the regulator circuits VREG and STBY_VREG, an output short signal "Short" for the regulator circuit VREG, and the like. The control signal ioctrl is used, for example, at the time of latching input/output signals to/from the I/O. The power-on reset circuit PONRST monitors, for example, the supply state of the external voltage of the external power supply Vext and the internal voltage of the internal power supply Vint0 after turn on of an external power, and outputs a power-on reset signal vextrst of the external power supply and a power-on reset signal vintrst of the internal power supply to the power control circuit PWR_CTR.

Figure 5:
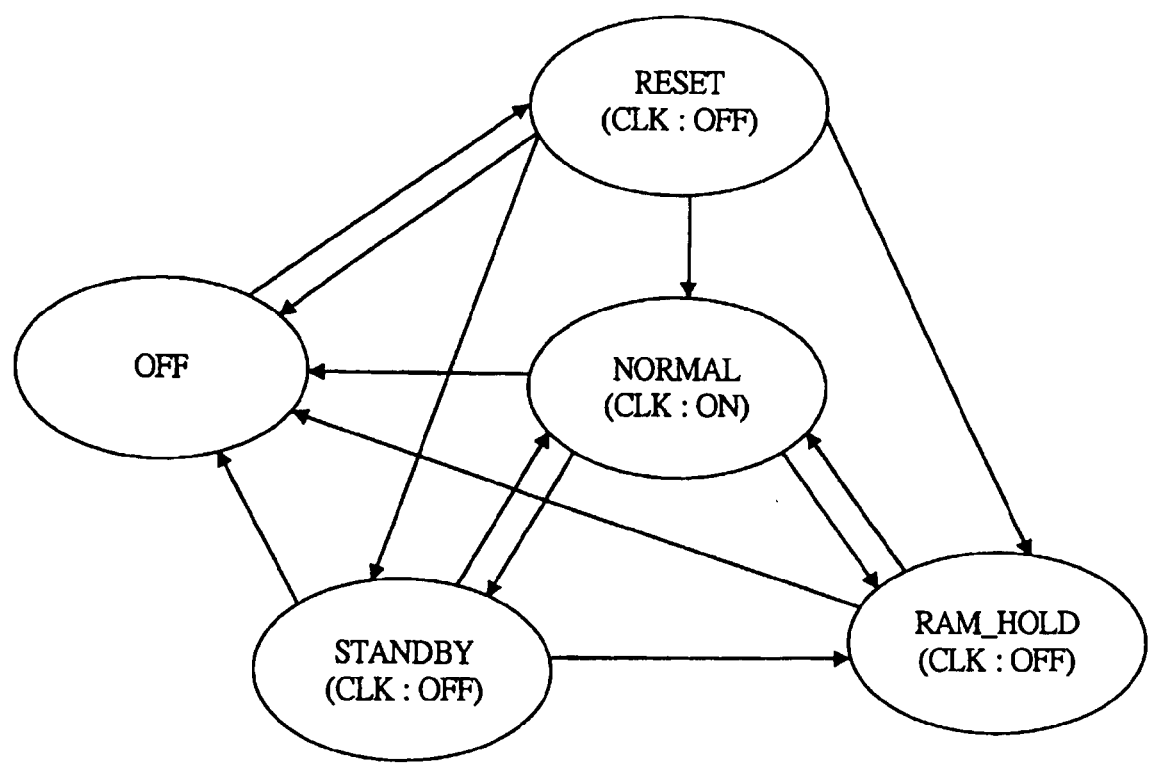
FIG. 5 is a mode transition diagram showing an example of internal modes of the semiconductor device of FIG. 4.

FIG. 5 is a mode transition diagram showing an example of internal modes of the semiconductor device of FIG. 4. FIG. 6 is a table showing an example of the correspondence relation between the internal modes of the semiconductor device of FIG. 4 and operating states of the internal circuits. As shown in the diagram, the semiconductor device of FIG. 4 has five internal modes such as an OFF mode (OFF), a reset mode (RESET), a normal operation mode (NORMAL), a standby mode (STANDBY), and a RAM holding mode (RAM_HOLD).

The OFF mode is a mode in which the voltage of the external power supply Vext is not supplied. Therefore, as shown in FIG. 6, the voltage of the external power line Vext is in the state of GND and the internal power lines Vint0 and Vint1 and the power switch SW0 are in an indeterminate state. The regulator circuit VREG and STBY_VREG are in the off state, the short ("Short") function of the internal power supply Vint1 (the function of connecting the voltage of the internal power supply Vint1 to the ground potential GND by the regulator circuit VREG) is in the off state, and the CPU and the RAM are in an operation stop state ("Stop").

The reset mode is a mode for delaying an operation start by a predetermined period so that the CPU and the like do not operate erroneously at the turn on of the external power supply Vext. Therefore, as shown in FIG. 6, a state where the voltage of the external power supply Vext is supplied and the voltage of the internal power supply Vint is supplied to the internal power supply lines Vint0 and Vint1, or the voltage in the internal power supply lines Vint0 and Vint1 is increasing toward the voltage Vint. The switch SW0 and the regulator circuits VREG and STBY_VREG are in the on state, the short function of the internal power supply Vint1 is in the off state, and the CPU and the RAM are in a reset input state (RST) The clock signal is in a stopped state.

The normal operation mode is a mode in which power and a clock signal are supplied and the semiconductor device performs normal operation. Therefore, as shown in FIG. 6, power is supplied to the external power supply Vext and the internal power supplies Vint0 and Vint1, the switch SW0 and the regulator circuits VREG and STBY_VREG are in the on state, the short function is in the off state, and the CPU and the RAM are in the operation state (active).

The standby mode is a mode in which supply of clock signals is stopped, the power switch SW0 remains on, and power is supplied to the CPU and the RAM by the standby regulator circuit STBY_VREG. Therefore, as shown in FIG. 6, power is supplied to the external power supply Vext and the internal power supplies Vint0 and Vint1, the switch SW0 and the standby regulator circuit STBY_VREG is in the on state, and the regulator circuit VREG and the short circuit function are in the off state. The CPU and the RAM are in the standby state (STBY).

The RAM holding mode is a mode in which supply of clock signals is stopped, the voltage of the internal power supply Vint1 of the CPU and the like is shorted to the ground potential GND, and only holding of data in the RAM is performed by supplying power to the standby regulator circuit STBY_VREG. Therefore, as shown in FIG. 6, although power is supplied to the external power supply Vext and the internal power supply Vint1, the internal power supply Vint1 is in the state of GND, and the switch SW0 is in the off state. The regulator circuit VREG is in the off state and the standby regulator circuit STBY_VREG is in the on state. The output short function of the internal power supply Vint1 is in the on state. The CPU is in the operation stop state in which power is interrupted, and the RAM is in the standby state in which power is supplied and data is held.

As long as the voltage of the external power supply Vext is supplied, the self current consumption in the semiconductor device having such internal modes has the relation that the current consumption in the reset mode and the normal operation mode>the current consumption in the standby mode>the current consumption in the RAM holding mode. As an example, the current consumption in the normal operation mode is 10 mA to 100 mA, that in the standby mode is 10 μA to 1 mA, and that in the RAM holding mode is 1 μA to 10 μA. Further, although not shown, an external voltage operation mode may be also included, in which the regulator circuits VREG and STBY_VREG are in an operation stop state (output indeterminate state) and only internal circuit blocks operated on the voltage of the external power supply Vext can operate.

Figure 7:
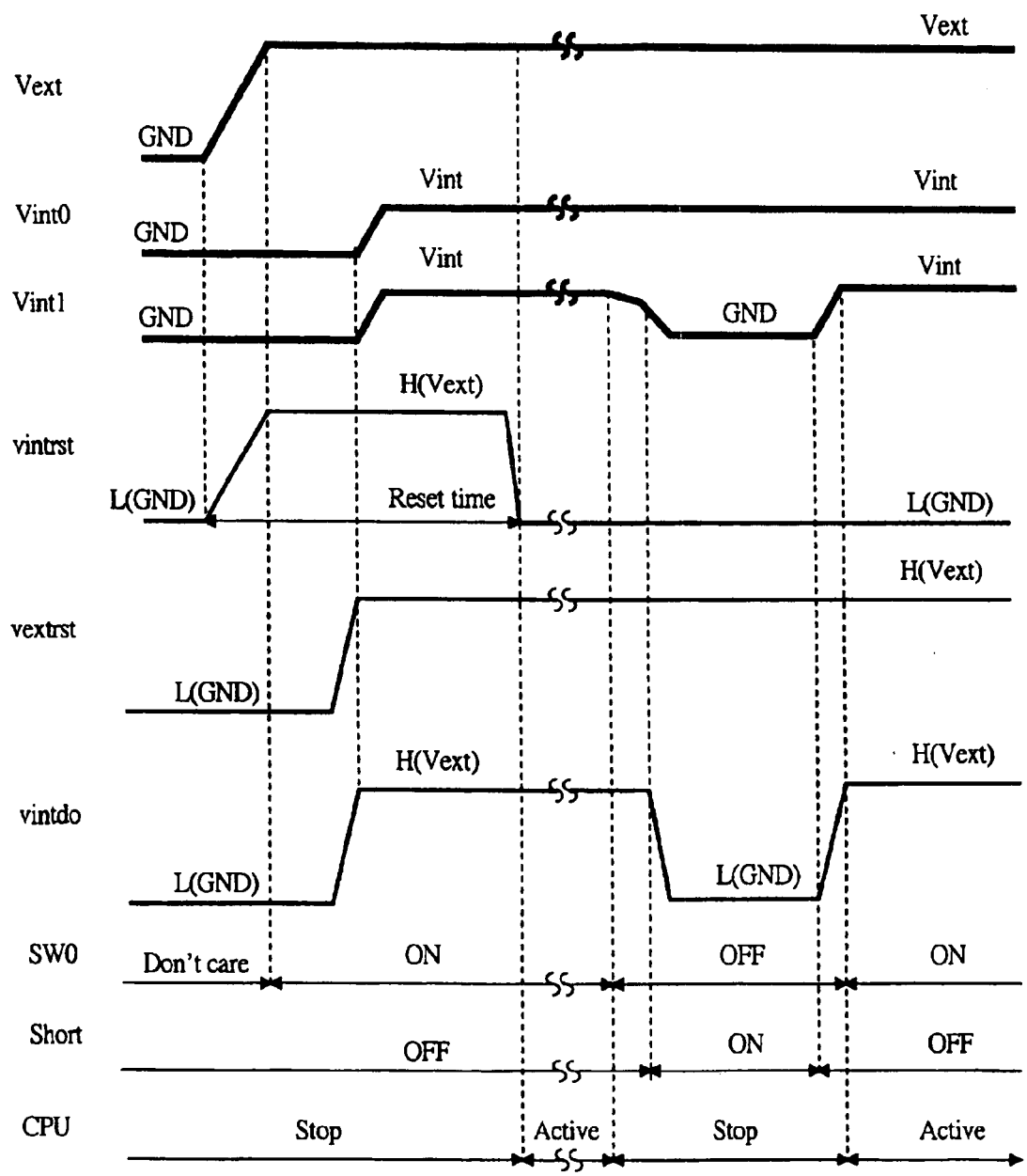
FIG. 7 is a waveform chart showing an example of the operations of the semiconductor device of FIG. 4.
Figure 8:
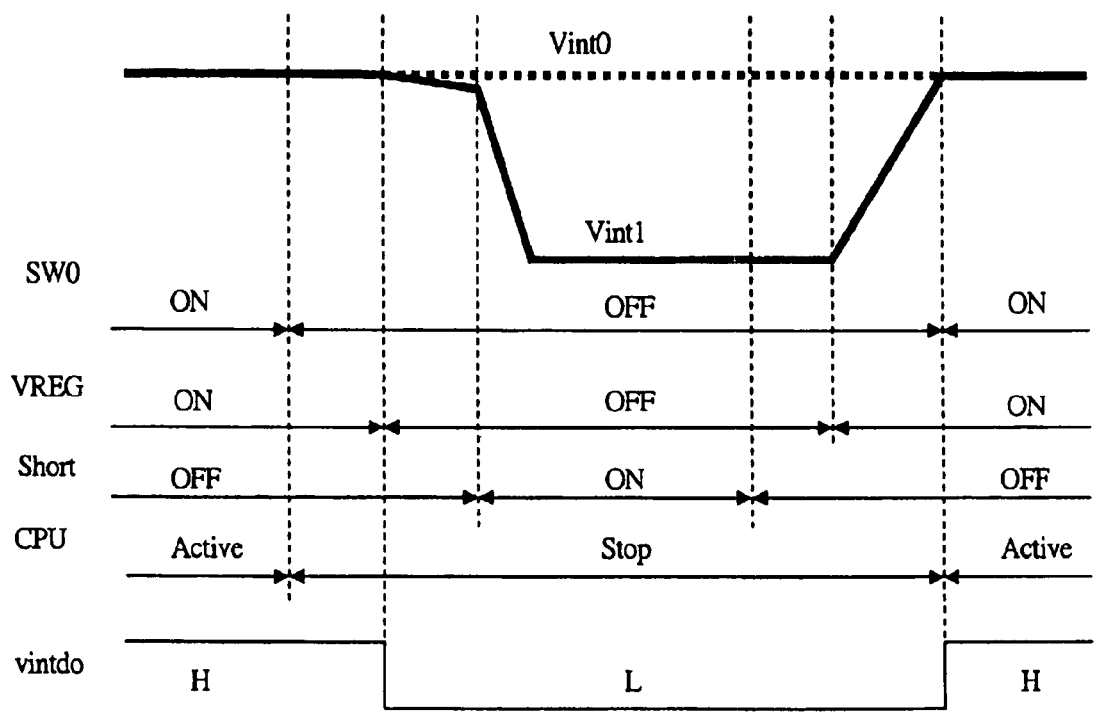
FIG. 8 is a waveform chart showing only an example of operations at the time of power shutoff and reset out of the operations of FIG. 7.

FIG. 7 is a waveform chart showing an example of the operations of the semiconductor device of FIG. 4. FIG. 8 is a waveform chart showing only an example of operations at the time of power shutdown and resetting out of the operations of FIG. 7. As shown in FIG. 7, after turn on of the external power supply Vext, the power-on reset circuit PONRST detects the voltage level of the external power supply Vext and, at the time point the voltage reaches a voltage level at which circuits operating on the voltage of the external power supply Vext can operate without malfunction, inverts the polarity of the power-on reset signal vextrst of the external power supply from the "L" level (GND) to the "H" level (Vext).

At turn-on of the external power supply Vext, the power-on reset circuit PONRST sets the power-on reset signal vintrst of the internal power supply to the "H" level (Vext) so that the circuits enter a reset state. After that, at the time point when the voltage reaches a voltage level at which circuits operating on the voltage of the internal power supply Vint can operate without malfunction and transmission/reception of signals between the circuits operating on the voltage of the external power supply Vext and circuits operating on the voltage of the internal power supply Vint can be performed without any problem, the power-on reset circuit PONRST sets the power-on reset signal vintrst to the "L" level (GND), and cancels the resetting. It makes, for example, the CPU or the like operative (active), and the semiconductor device enters the normal operation mode.

When a mode switch signal to the RAM holding mode is input in the normal operation mode, for example, the semiconductor device operates as shown in FIG. 8. First, the power control circuit PWR_CTL drives the enable signal ensw to turn off the power switch SW0 and, simultaneously, drives the enable signal encpu to stop the operation of the CPU. At this time, for example, a register value in the CPU is saved. Subsequently, the power control circuit PWR_CTL drives the enable signal enreg to turn off the regulator circuit VREG. By the operation, an output of the regulator circuit VREG becomes open and the voltage of the internal power supply Vint1 decreases. On the other hand, the voltage of the internal power supply Vint0 is held. The internal voltage determining circuit VINTDET detects a voltage drop in the voltage of the internal power supply Vint1 and sets the detection signal vintdo to the "L" level.

When the power control circuit PWR_CTR turns on the output short circuit signal "Short", an output (internal power supply Vint1) of the regulator circuit VREG is shorted to the ground potential GND, and the voltage of the internal power supply Vint1 rapidly decreases. It makes the internal power supply Vint1 enter a complete shutdown state. On the other hand, power is supplied to the internal power supply Vint0 from the standby regulator circuit STBY_VREG, so that data stored in the RAM is held.

When the mode switch signal for switching the mode to the normal operation mode is input in the RAM holding mode, various operations are performed in the procedure reverse to that of the power shutdown. To be specific, first, the output short circuit signal "Short" is turned off and, next, the regulator circuit VREG is turned on by the enable signal enreg. By the operation, the voltage of the internal power supply Vint1 rises. The internal voltage determining circuit VINTDET detects the voltage level and, at the time point when the voltage reaches a voltage level at which circuits operating on the voltage of the internal power supply Vint1 can operate without malfunction and transmission/reception of signals between a circuit operating on the voltage of the external power supply Vext and a circuit operating on the voltage of the internal poser supply Vint1 can be performed without any problem, sets the detection signal vintdo to the "H" level.

On receipt of the shift to the "H" level, the power control circuit PWR_CTR turns on the switch SW0 by the enable signal ensw and operates the CPU by the enable signal encpu. The shift of the detection signal to the "H" level functions as a direct/indirect trigger of operation start in circuits connected to the internal power supply Vint1. In other words, the enable signal encpu is not always generated directly from the shift to the "H" level. For example, a PLL circuit is started by using the shift to the "H" level as an indirect trigger for starting the CPU and, after a clock signal generated by the PLL circuit is stabilized, the enable signal encpu is generated.

Although the operations described with reference to FIG. 8 are similar to those of FIG. 2, operations as shown in FIG. 3 can be also performed. As understood from the configuration of FIG. 4 and the operations of FIGS. 7 and 8, by connecting the power-on reset circuit PONRST having also a function of detecting voltage levels including rise and drop of the internal supply voltage to the internal power supply Vint0 side, normal operations of the power-on reset circuit PONRST can be assured.

It is desirable to make the power-on reset circuit PONRST operate only at the turn on of the external power supply Vext from the viewpoint of a use purpose. Therefore, the power-on reset circuit PONRST has to be connected to the internal power supply Vint0 which is not shut down as long as the voltage of the external power supply Vext reaches a specific voltage level. In the other cases, there is the possibility that the power-on reset circuit PONRST itself is initialized or performs misoperation. In the case where the power-on reset circuit PONRST is connected to the internal pwer supply Vint0 and, for example, sequences of power shutoff and resetting as described above are not used, it is feared that malfunction occurs in the power-on reset circuit PONRST due to voltage fluctuations in the voltage of the internal power supply Vint0 accompanying timings of the power switch SW0.

On the other hand, the internal voltage determining circuit VINTDET is necessary to detect the level of each of a single internal source voltage or a plurality of internal source voltages. Without the internal voltage determining circuit VINTDET, an internal power supply in which power shutdown occurs in the whole system or whether the power is reset or not cannot be accurately determined. Therefore, the power-on reset circuit PONRST is connected to at least one internal power supply in which power shutdown does not occur, and the internal voltage determining circuit VINTDET is connected to each of the internal power supplies in which power shutdown occurs. Although the power-on reset circuit PONRST and the internal voltage determining circuit VINTDET are disposed as different circuits in FIG. 4, obviously, they may be integrated to a single circuit.

Figure 9:
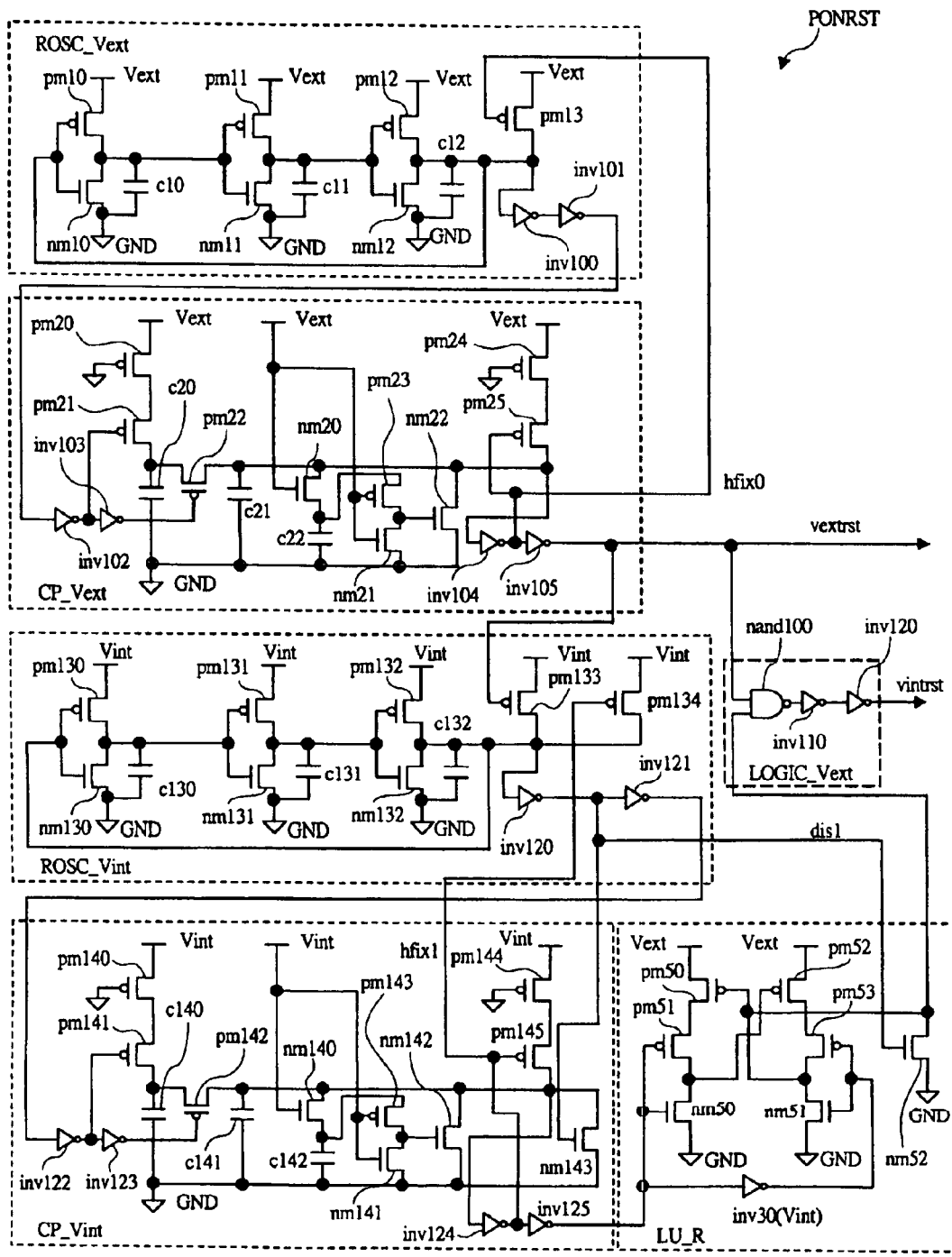
FIG. 9 is a circuit diagram showing an example of the configuration of a power-on reset circuit in the semiconductor device of FIG. 4.

FIG. 9 is a circuit diagram showing an example of the configuration of the power-on reset circuit in the semiconductor device of FIG. 4. The power-on reset circuit PONRST of FIG. 9 is used by being connected to the external power supply Vext and the internal power supply Vint0 which is not interrupted in the semiconductor device of FIG. 4. Prior to description of the configuration of FIG. 9, a normal power-on reset circuit will be described first.

Generally, at the turn-on of the external power supply, the rise time of the external power supply Vext varies according to the influences of impedances on the outside/inside of the chip and variations in the rise characteristics of an external power supply used. Therefore, the rise time of the internal power supply Vint of the chip on which internal power supply circuits as shown in FIG. 4 are mounted does not become constant, so that the chip is set in a reset state for a predetermined period from power-on and operations of the CPU and the like have to be stopped until the external power supply Vext and the internal power supply Vint are stabilized. In many cases, consequently, a reset signal is received for a predetermined period from the outside of the chip or the power-on reset circuit PONRST is provided in the chip to generate the power-on reset signal.

In the case of using the power-on reset circuit PONRST, it is difficult to receive an accurate reference voltage for determining the voltage level and stably operate a determining circuit such as a comparator at the turn-on of an external power supply. Consequently, a method of using the difference between a threshold of a PMOS transistor and a threshold of an NMOS transistor, a method of using only an analog delay caused by a resistor and a capacitor which are not directly related to the voltage level, and the like may be considered. In the case of using an analog delay, for example, a circuit as shown in FIG. 34 is employed.

Figure 34:
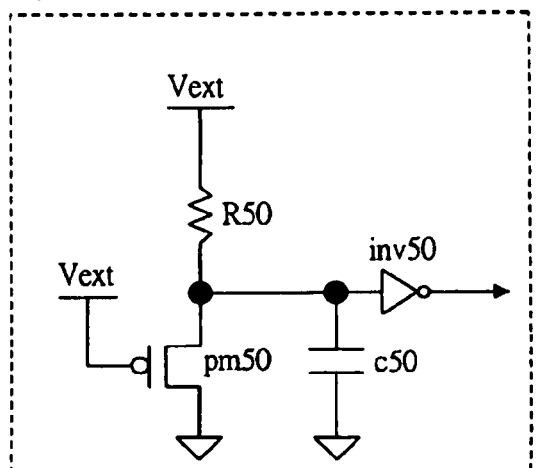
FIG. 34 is a circuit diagram showing an example of another configuration of the power-on reset circuit in the semiconductor device of FIG. 4.
Figure 35:
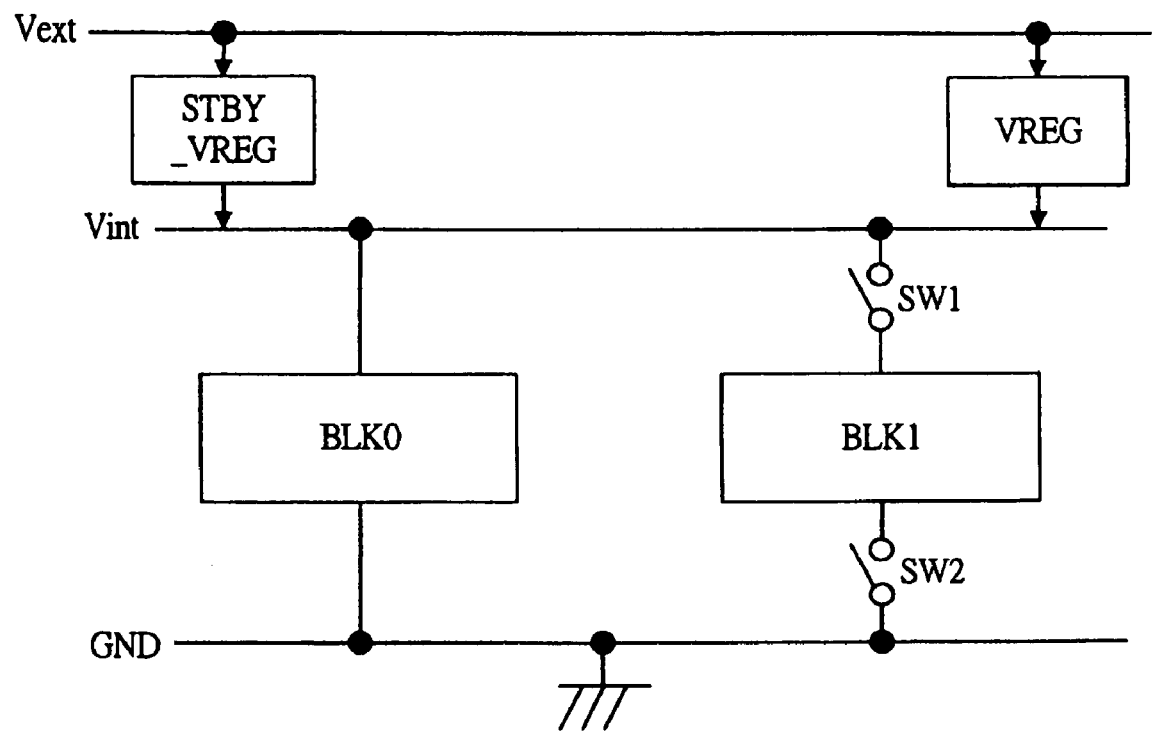
FIG. 35 is a block diagram showing an example of a schematic configuration of a semiconductor device examined as a precondition of the present invention.

FIG. 34 is a circuit diagram showing an example of another configuration of the power-on reset circuit in the semiconductor device of FIG. 4. The power-on reset circuit PONRST shown in FIG. 34 has a simple system in which a delay is provided by a resistor and a capacitor from the external power supply Vext and the gate of a MOS transistor in an inverter circuit inv50 is driven by a voltage accumulated in the capacitor.

Such a system, however, has low determination precision. When a delay period is set to be too long for fear of malfunction of the chip, a problem such that it takes long time to start the chip may occur. If the delay period is set to be too short, the reset may be cancelled before the voltage reaches a voltage level at which circuits operating on the voltages in the external power supply Vext and the internal power supply Vint can operate after determination of the voltage level, or before transmission of signals transmitted between a circuit operating on the external power supply Vext and a circuit operating on the internal power supply Vint has been finished. Therefore, although the power-on reset circuit PONRST as shown in FIG. 34 may be applied to the semiconductor device of FIG. 4, the power-on reset circuit PONRST as shown in FIG. 9 is more preferable.

The power-on reset circuit PONRST shown in FIG. 9 has, for example, two ring oscillators ROSC_Vext and ROSC_Vint, two charge pump circuits CP_Vext and CP_Vint, an up-shifter LU_R, and a logic circuit LOGIC_Vext. The ring oscillator ROSC_Vext functions as a replica circuit representing a circuit operating on the voltage of the external power supply Vext, and the ring oscillator ROSC_Vint functions as a replica circuit representing a circuit operating on the voltage of the internal power supply Vint. The charge pump circuits CP_Vext and CP_Vint are used to provide a delay for a predetermined period until the replica circuits are stabilized.

The up-shifter LU_R functions as a replica circuit representing a circuit for transmitting/receiving a signal between the circuit operating on the voltage of the external power supply Vext and the circuit operating on the voltage of the internal power supply Vint. Therefore, it can be said that if the replica circuits can operate without any problem, there is no problem with the voltage level of the external power supply Vext and signal transmission/reception between the external power supply Vext and the internal power supply Vint. Operation rejects of the replica circuits are output as the power-on reset signals vextrst and vintrst.

In FIG. 9, the ring oscillator ROSC_Vext and the charge pump circuit CP_Vext generate a power-on reset signal vextrst for Vext. On the other hand, the signal generated by the ring oscillator ROSC_Vint and the charge pump circuit CP_Vint is input to the up-shifter LU_R. The up-shifter LU_R shifts the input signal of the Vint level to a signal of the Vext level and outputs the resultant signal to the logic circuit LOGIC_Vext. The logic circuit LOGIC_Vext computes AND between an output of the up-shifter LU_R and the power-on reset signal vextrst, thereby generating the power-on reset signal vintrst for Vint. By using such a power-on reset circuit, the possibility of occurrence of malfunction at power-on can be reduced.

Figure 10:
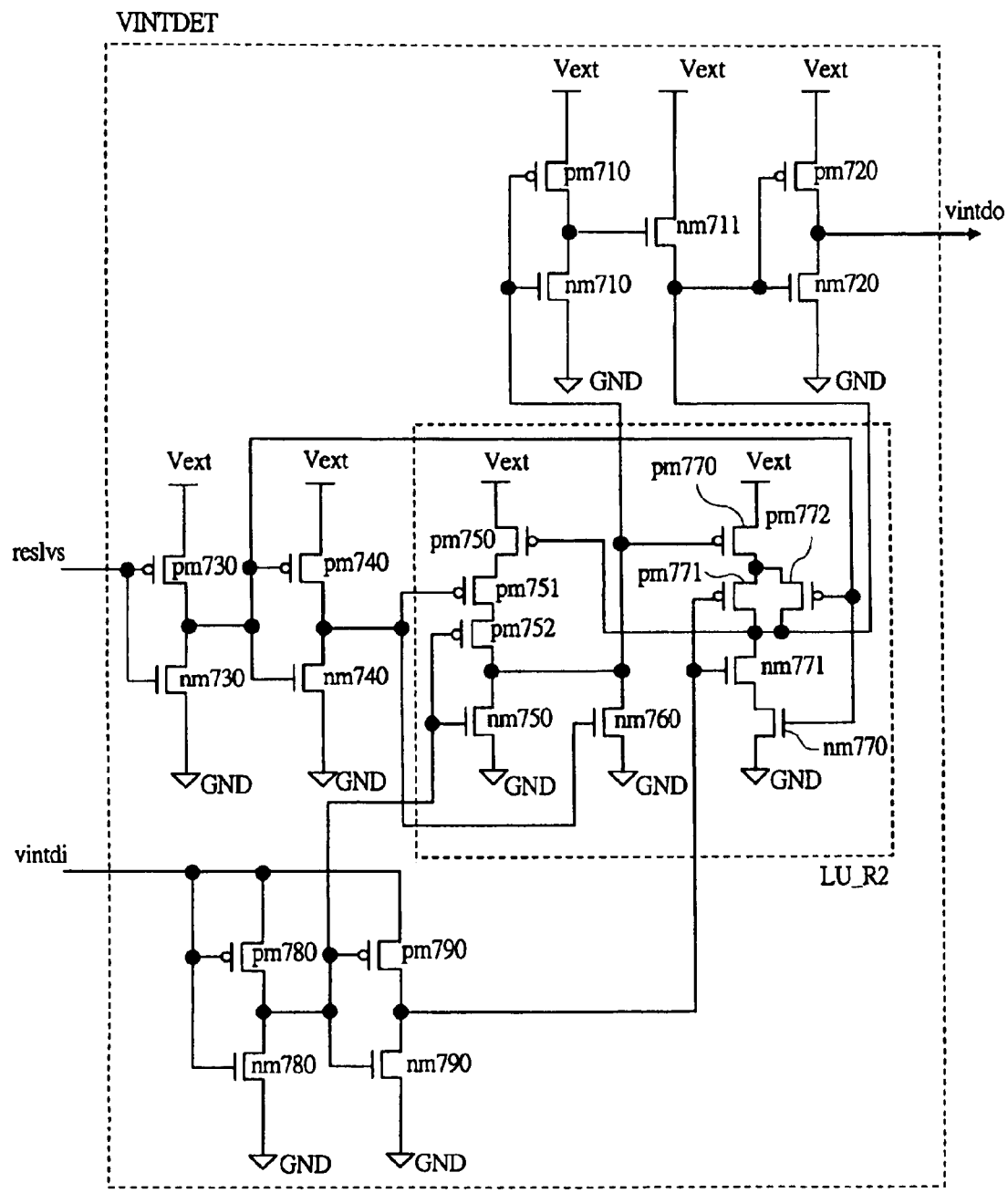
FIG. 10 is a circuit diagram showing an example of the configuration of an internal voltage determining circuit in the semiconductor device of FIG. 4.

FIG. 10 is a circuit diagram showing an example of the configuration of the internal voltage determining circuit in the semiconductor device of FIG. 4. The internal voltage determining circuit VINTDET shown in FIG. 10 includes an up-shifter LU_R2 in a manner similar to the configuration of FIG. 9, and the up-shifter LU_R2 functions as a replica circuit representing a signal transmission/reception circuit between a circuit operating on the voltage of the external power supply Vext and a circuit operating on the voltage of the internal power supply Vint. The internal voltage determining circuit VINTDET uses, as an input signal, the signal vintdi connected to the internal power supply Vint1, converts the voltage determination result of the internal power supply Vint1 to a detection signal vintdo of the Vext level, and outputs the resultant signal.

In FIG. 10, the circuit using vintdi as a self input signal and power supply sends an output in which the voltage level of the signal vintdi is reflected to the up-shifter LU_R2. When the voltage level reaches a desired level, the up-shifter LU_R2 can operate normally. That is, the voltage level of vintdi is determined and whether transmission/reception between a signal operated at the voltage level of Vint and a signal operated at the voltage level of Vext can be performed or not is determined. A circuit which receives a self reset signal reslvs and operating on the voltage of the external power supply Vext is provided to preliminarily reset the gate nodes of PMOS transistors pm770 and pm750 of the up-shifter LU_R2 to complementary voltage levels by itself. By preliminarily performing the self reset, determination of the signal vintdi using the up-shifter LU_R2 can be performed without malfunction.

The up-shifter UL_R2 is reset when the self reset signal reslvs is at the "H" level and determines the signal vintdi when the self reset signal reslvs is at the "L" level. Since such a self reset signal reslvs may shift so as to, for example, decrease when the signal vintdi rises, the self reset signal reslvs can be also generated via an inverter circuit in which a logic threshold value is adjusted on the basis of the signal vintdi, or the like.

FIG. 11 is a circuit diagram showing an example of the configuration of a power switch in the semiconductor device of FIG. 4. The power switch SW0 in FIG. 11 is constructed by, for example, a PMOS transistor pmsw0 having a gate width W and a gate length Lg. When a gate "g" in the PMOS transistor pmsw0 is set to the "L" level (GND), the switch is turned on. When the gate "g" is set to the "H" level (Vext), the switch is turned off. When the power switch is constructed by a PMOS transistor, the gate width W is larger as compared with that in an NMOS transistor due to variations in carrier mobility. However, the external power supply Vext is generally at a voltage level having a voltage range. Therefore, for example, in the case where the power switch is constructed by an NMOS transistor, when the gate "g" is at the "H" level (Vext), the switch is turned on. A current flowing between the source and the drain is influenced by a voltage between the gate and the source (that is, depends on the external power supply Vext) and does not become constant.

On the other hand, in the case of the PMOS transistor, by setting the gate "g" to the "L" level (GND), the switch is turned on, so that there is an advantage that the influence of the external power supply Vext is not exerted. By connecting a body "b" to a source "s", the influence of the substrate effect on the current passed between the source and the drain is eliminated. As compared with the case of connecting the body "b" to the external power supply Vext, a larger current can be passed even with the same gate width W. In the case of applying the PMOS transistor pmsw0 to the power switch SW0 in FIG. 4, the source "s" has to be connected to the internal power supply Vint0 side which is not interrupted, and the drain "d" has to be connected to the internal power supply Vint1 side which is not interrupted. When the source "s" is connected to the internal power supply Vint1 side and the drain "d" is connected to the internal power supply Vint0 side, current flows from the drain "d" to the body "b" at the time of power shutdown.

FIG. 12 is a diagram for comparison among various configuration examples of the power switch in the semiconductor device of FIG. 4. In FIG. 12, as configuration examples of the power switch SW0, four configuration examples including the above-described PMOS transistor pmsw0 are shown. The three examples except for the PMOS transistor pmsw0 relate to an NMOS transistor nmsw0 in which the body "b" and the source "s" are connected, an NMOS transistor nmsw1 in which the body "b" is connected to the ground GND, and a PMOS transistor pmsw1 in which the body "b" is connected to the external power supply Vext.

The gate widths in the transistors have relations that nmsw0<pmsw0, nmsw1<pmsw1, nmsw0<nmsw1, and pmsw0<pmsw1. In the NMOS transistors nmsw0 and nmsw1, as described above, bias dependence of the gate voltage exists different from the PMOS transistors pmsw0 and pmsw1. Further, in the configuration of the transistors nmsw1 and pmsw1 in which the body has a fixed voltage, bias dependence of the body voltage exists different from the configurations of the transistors nmsw0 and pmsw0 in which the body and the source are connected.

Figure 13:
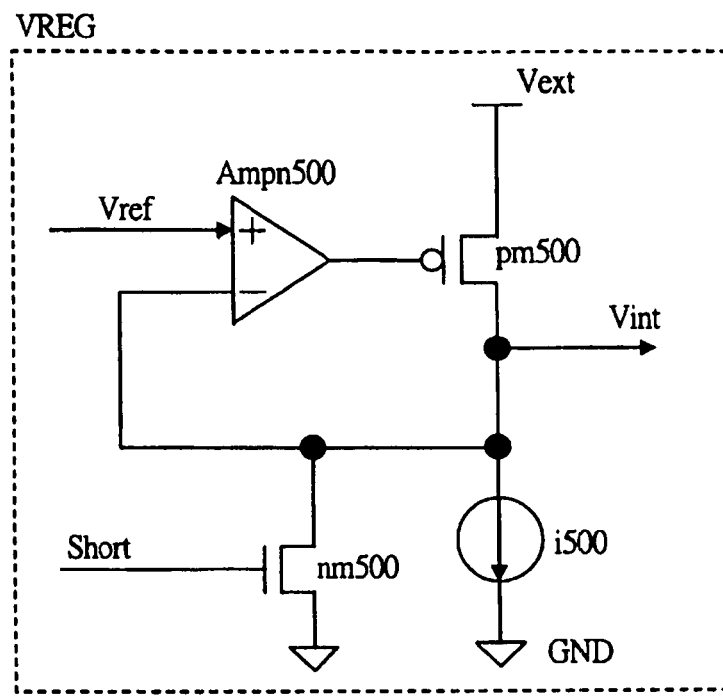
FIG. 13 is a circuit diagram showing an example of the configuration of a regulator circuit in the semiconductor device of FIG. 4.
Figure 14:
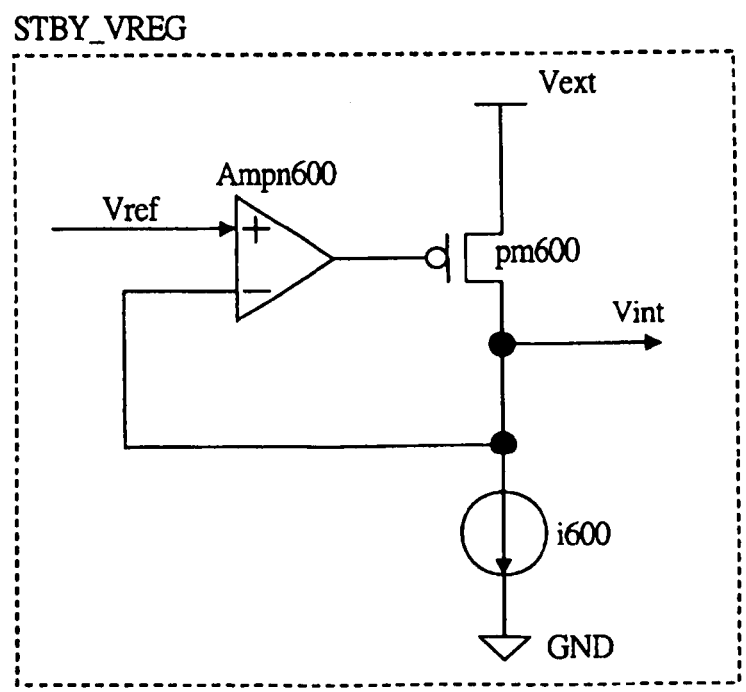
FIG. 14 is a circuit diagram showing an example of the configuration of a standby regulator circuit in the semiconductor device of FIG. 4.

FIG. 13 is a circuit diagram showing an example of the configuration of the regulator circuit in the semiconductor device of FIG. 4. FIG. 14 is a circuit diagram showing an example of the configuration of the standby regulator circuit in the semiconductor device of FIG. 4.

The regulator circuit VREG in FIG. 13 is a circuit for decreasing the voltage of the external power supply Vext and supplying the voltage of the internal power supply Vint. In the configuration, in addition to a general configuration including an amplifier circuit Ampn500, a PMOS transistor pm500, and a current source i500, the NMOS transistor nm500 is provided that connects the output Vint of the regulator circuit VREG to the ground GND by the output short signal "Short". An output of the amplifier circuit Ampn500 is connected to the gate of the PMOS transistor pm500. A reference voltage Vref is input to one of inputs of the amplifier circuit Ampn500 and a voltage is fed back from the drain (Vint) of the PMOS transistor pm500 to the other input.

At the time of turning off the regulator circuit VREG, for example, the output short signal Short is turned off ("L" level), the amplifier circuit Ampn500 is stopped to set its output to the "H" level (Vext), and the current source i550 is interrupted to set an open state. As a result, the output Vint of the regulator circuit VREG becomes open.

On the other hand, the standby regulator circuit STBY_VREG used on the side which is not interrupted has a circuit configuration as shown in FIG. 14 similar to that of FIG. 13. The difference from the circuit configuration of FIG. 13 is that the NMOS transistor nm500 having the short function does not exist. There is also a not-shown difference that current consumption of the amplifier circuit Ampn600 and the current source i600 is smaller than that of the amplifier circuit Ampn500 and the current source i500 by one digit or more, and the driving capability of the PMOS transistor pm600 is lower than that of the PMOS transistor pm500 by one digit or more.

Figure 15:
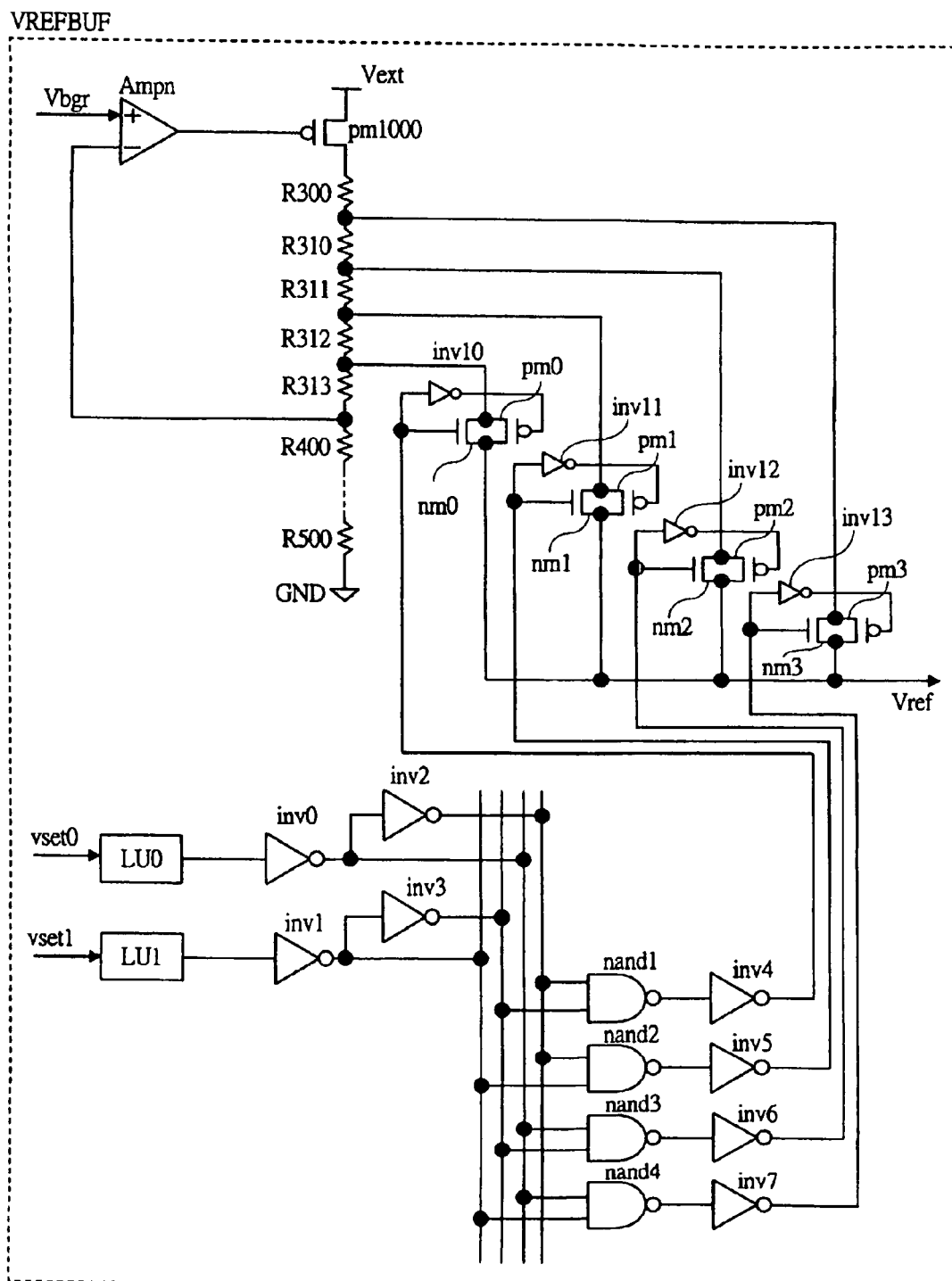
FIG. 15 is a circuit diagram showing an example of the configuration of an internal source voltage setting circuit in the semiconductor device of FIG. 4.
Figure 16:
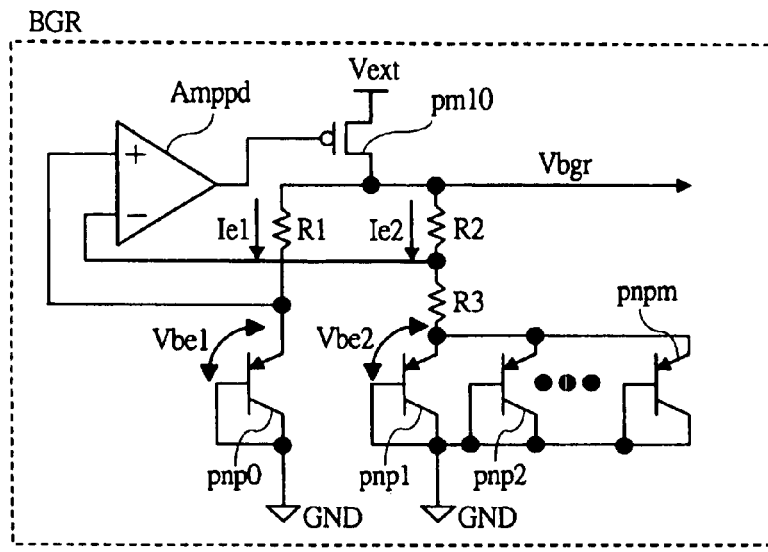
FIG. 16 is a circuit diagram showing an example of the configuration of a reference voltage generating circuit in the semiconductor device of FIG. 4.

FIG. 15 is a circuit diagram showing an example of the configuration of the internal source voltage setting circuit in the semiconductor device of FIG. 4. FIG. 16 is a circuit diagram showing an example of the configuration of a reference voltage generating circuit in the semiconductor device of FIG. 4. The internal source voltage setting circuit VREFBUF generates the reference voltage Vref input to an amplifier circuit in the regulator circuits VREG and STBY_VREG.

The internal source voltage setting circuit VREFBUF has a general configuration including, for example, as shown in FIG. 15, the amplifier circuit Ampn, a PMOS transistor pm1000, and a plurality of resistive elements. The reference voltage Vref can be set on the basis of the relation between the reference voltage Vbgr applied to the amplifier circuit Ampn and the dividing ratio of the resistive elements. In FIG. 15, various circuits for arbitrarily setting the dividing ratio of the resistive elements are provided.

The reference voltage Vbgr is generated by the reference voltage generating circuit BGR which is a so-called band gap reference utilizing a Vbe characteristic of a bipolar transistor as shown in FIG. 16. The reference voltage Vbgr generated by the reference voltage generating circuit BGR is a stable voltage of about, for example, 1.2V having low temperature dependence and low dependence on the external power supply Vext. As the reference voltage Vbgr generated by the reference voltage generating circuit BGR, a voltage in the range from 0.6V to 1.2V can be generated according to the circuit configuration.

Although the operations and various detailed circuits have been described above on the basis of the configuration example of the semiconductor device of FIG. 4, modifications of the configuration of FIG. 4 will be described hereinbelow while paying attention to main difference points.

Figure 17:
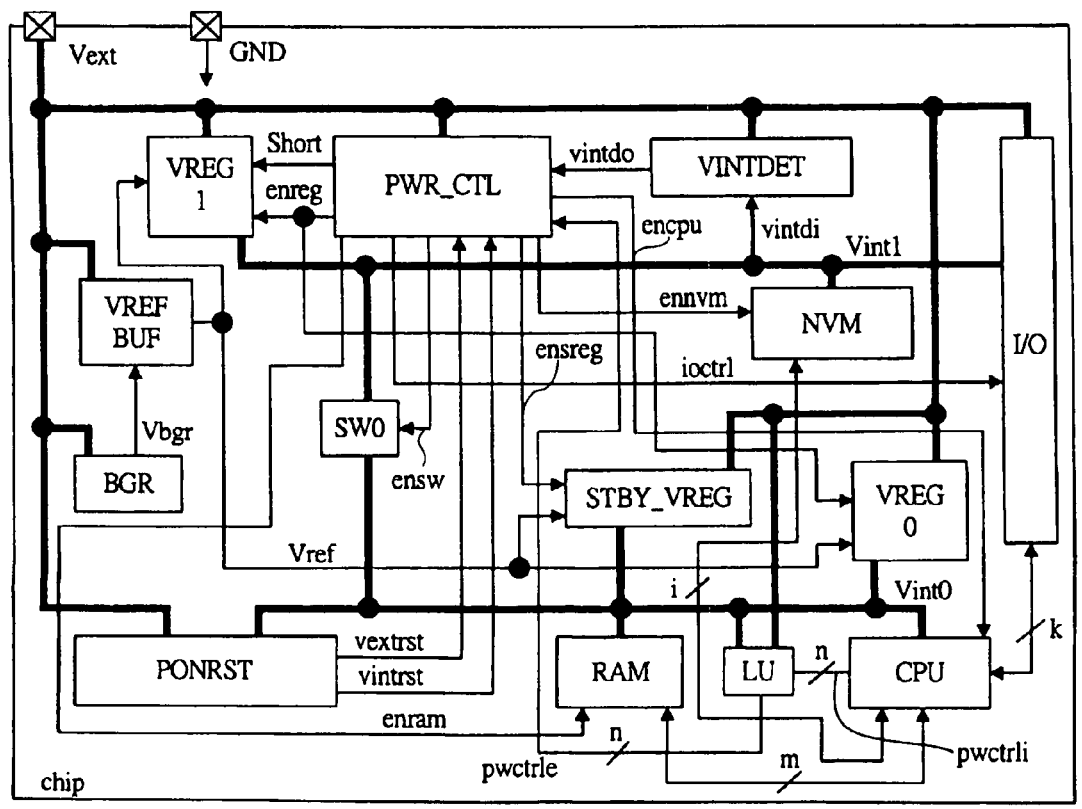
FIG. 17 is a block diagram showing another example of the configuration of the semiconductor device according to an embodiment of the invention.

FIG. 17 is a block diagram showing another example of the configuration of the semiconductor device according to an embodiment of the invention. In a semiconductor device shown in FIG. 17, a nonvolatile memory NVM is mounted in addition to the configuration example of FIG. 4. Since self current consumption in the normal operation mode in the nonvolatile memory NVM is large, the internal power supplies Vint0 and Vint1 are provided with the regulator circuits VREG0 and VREG1 to supply current to the CPU, the RAM, and the NVM.

The NVM is connected to the internal power supply Vint1, and the RAM and CPU are connected to the internal power supply Vint0. The internal power supply Vint1 can be interrupted by turning off the regulator circuit VREG1 or the switch SW0. Since the self consumption current in the NVM is large also in the standby mode, consumption current can be reduced by the power shutdown. By providing both of the internal power supplies with the regulator circuits and supplying power by using both of the circuits, a voltage drop accompanying on-state resistance of the switch SW0 which may occur at the time of supplying power only from one of the circuits can be reduced.

FIG. 18 is a table showing an example of the corresponding relation between the internal modes of the semiconductor device of FIG. 17 and operating states of the internal circuits. In FIG. 18, the OFF mode, the reset mode, and the normal operation mode shown in FIG. 6 and, in addition, a standby mode 1 (STANDBY1) and a standby mode 2 (STANDBY2) are provided. In the standby mode 1, power is supplied to the CPU and the RAM only by the standby regulator circuit STBY_VREG in a state where the clock signal is stopped. In this case, the internal power supply Vint1 of the nonvolatile memory NVM is isolated from the standby regulator circuit STBY_VREG by turning off the switch SW0 and is made open (Hiz).

On the other hand, in the standby mode 2, different from the standby mode 1, the internal power supply Vint1 of the nonvolatile memory NVM is connected to the GND by an output short function of the regulator circuit VREG1. The self current consumption can be reduced in the standby mode 2 more than the standby mode 1. "Read" of the nonvolatile memory NVM in the reset mode is performed, for example, for making initial settings of various circuits by using read data of the nonvolatile memory NVM.

Figure 19:
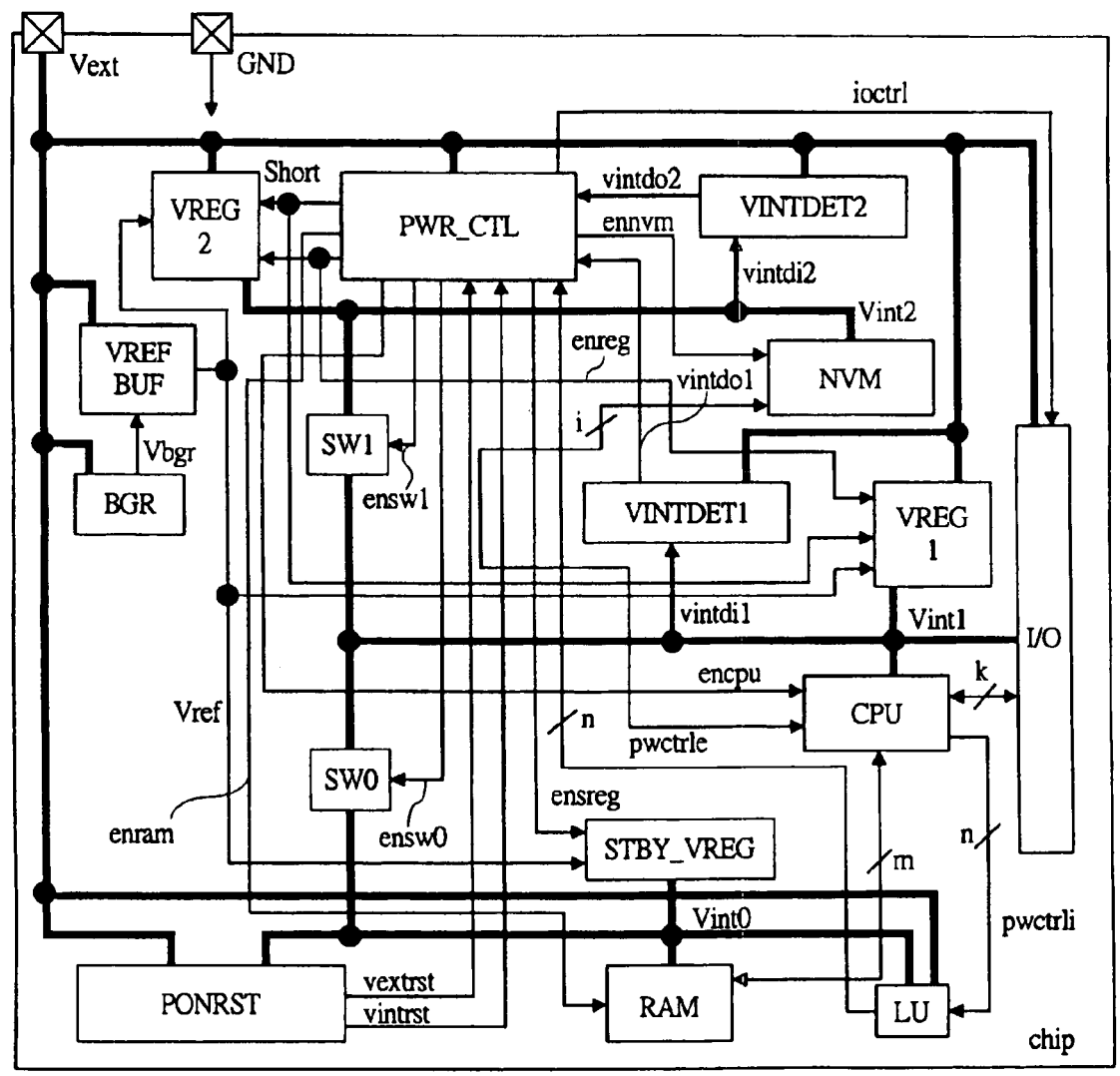
FIG. 19 is a block diagram showing further another example of the configuration of the semiconductor device according to an embodiment of the invention.

FIG. 19 is a block diagram showing further another example of the configuration of the semiconductor device according to the embodiment of the invention. The semiconductor device shown in FIG. 19 has a configuration that, different from the configuration in which the CPU and the RAM are connected to the internal power supply Vint0 in FIG. 17, the CPU and the RAM are connected to different internal power supplies and are separated from each other. Therefore, internal power supplies Vint0, Vint1, and Vint2 of three systems are provided and a power switch SW1 is added.

In FIG. 19, the RAM is connected to the internal power supply Vint0, the CPU is connected to the internal power supply Vint1, and the NVM is connected to the internal power supply Vint2. The standby regulator circuit STBY_REG is connected to Vint0, the regulator circuit VREG1 is connected to Vint1, and the regulator circuit VREG2 is connected to Vint2. The switch SW0 is provided between Vint0 and Vint1, and the switch SW1 is provided between Vint1 and Vint2. Alternately, the switch SW1 can be provided between Vint0 and Vint2.

In such a configuration, power can be shut down in each of the internal power supplies Vint1 and Vint2 by stopping a corresponding regulator circuit or setting of the power switch. Therefore, an internal voltage determining circuit VINTDET1 is provided for the internal power supply Vint1, and an internal voltage determining circuit VINTDET2 is provided for the internal power supply Vint2.

FIG. 20 is a table showing an example of the correspondence relation between internal modes of the semiconductor device of FIG. 19 and operating states of the internal circuits. In FIG. 20, the OFF mode, the reset mode, and the normal operation mode shown in FIG. 6 and, in addition, a standby mode (STANDBY), a standby mode 1 (STANDBY1) and a RAM holding mode (RAM_HOLD) are provided.

In the standby mode, in a manner similar to FIG. 6, power is supplied to the CPU, the RAM, and the NVM only by the standby regulator circuit STBY_VREG in a state where the clock signal is stopped. In the standby mode 1, power is supplied to the CPU and the RAM only by the standby regulator circuit STBY_VREG in a state where the clock signal is stopped and the internal power supply Vint2 of the NVM is opened (Hiz) by turn-off of the switch SW1. In the RAM holding mode, in a manner similar to FIG. 6, power is supplied only to the RAM by the standby regulator circuit STBY_VREG in a state where the clock signal is stopped. In this case, the internal power supply Vint1 of the CPU and the internal power supply Vint2 of the NVM are isolated from the standby regulator circuit STBY_VREG by turning off the switches SW0 and SW1, and are connected to the ground GND by the output short function of the regulator circuits VREG1 and VREG2.

Figure 21:
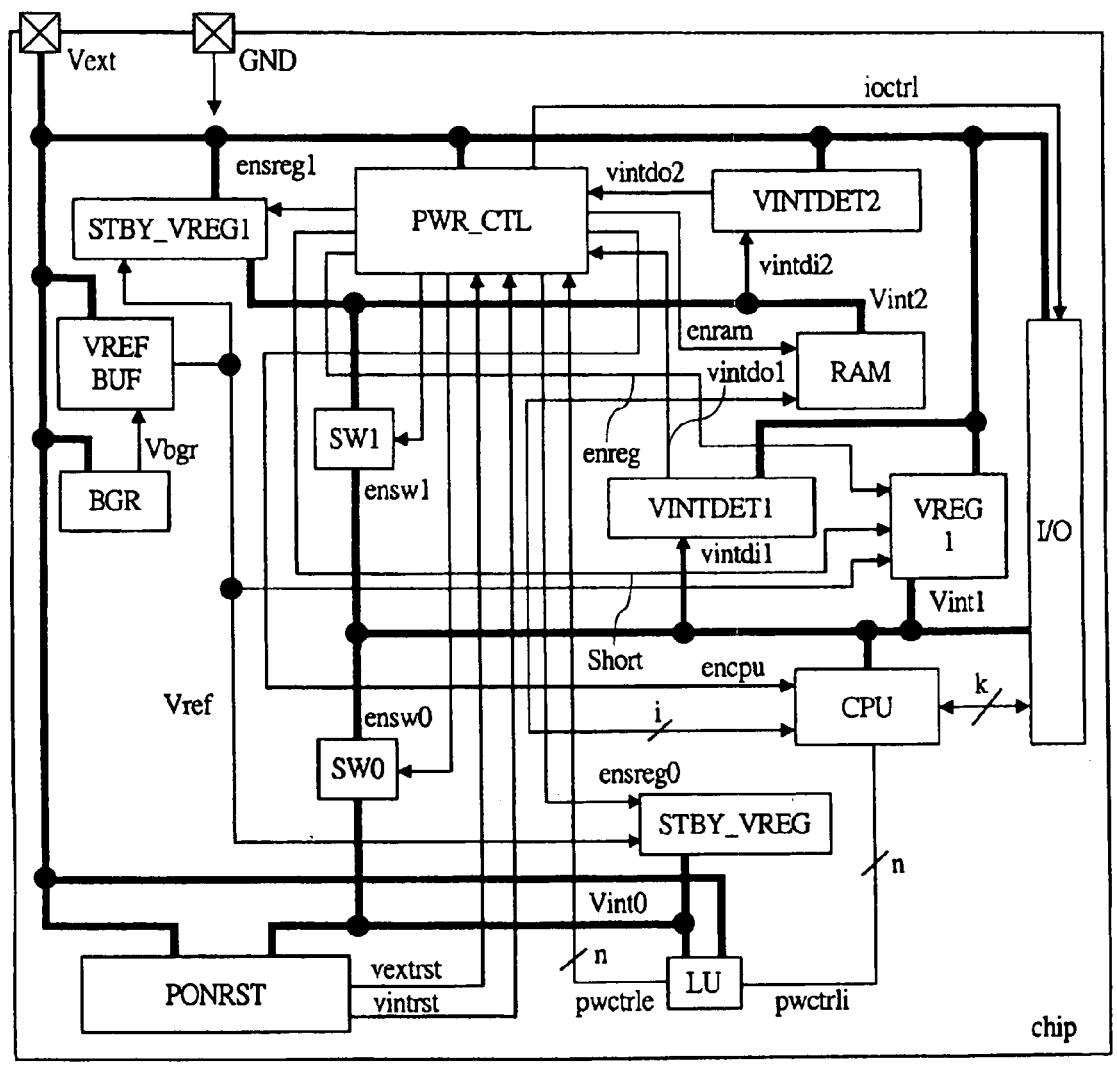
FIG. 21 is a block diagram showing further another example of the configuration of the semiconductor device according to an embodiment of the invention.

FIG. 21 is a block diagram showing further another example of the configuration of a semiconductor device according to an embodiment of the invention. The semiconductor device shown in FIG. 21 has internal power supplies Vint0, Vint1, and Vint2 of three systems. The up-shifter LU is connected to the internal power supply Vint1, and the RAM is connected to the internal power supply Vint2. The standby regulator circuit STBY_REG0 is connected to the internal power supply Vint0, the regulator circuit VREG is connected to the internal power supply Vint1, and the standby regulator circuit STBY_VREG1 is connected to the internal power supply Vint2. The switch SW0 is provided between Vint0 and Vint1, and the switch SW1 is provided between Vint1 and Vint2. It is assumed that the standby regulator circuit STBY_VREG1 and the regulator circuit VREG have the output short function.

FIG. 22 is a table showing an example of the correspondence relation between internal modes of the semiconductor device of FIG. 21 and operating states of the internal circuits. In FIG. 22, the OFF mode, the reset mode, and the normal operation mode shown in FIG. 6 and, in addition, a standby mode (STANDBY), a RAM holding mode (RAM_HOLD), and an LU holding mode (LU_HOLD) are provided.

In the standby mode, power is supplied to the CPU, the RAM, and the LU by the two standby regulator circuit STBY_VREG0 and STBY_VREG1 in a state where the clock signal is stopped. In the RAM holding mode, power is supplied to the RAM and the LU by the two standby regulator circuits STBY_VREG0 and STBY_VREG1 in a state where the clock signal is stopped. In this case, the internal power supply Vint1 in the CPU is isolated from the standby regulator circuits STBY_VREG0 and STBY_VREG1 by turning off the switches SW0 and SW1, and are connected to the ground GND by the output short function of the regulator circuit VREG. That is, the internal power supply Vint is in a power shutdown state.

In the LU holding mode, power is supplied only to the up-shifter LU by the standby regulator circuit STBY_VREG0. The internal power supply Vint1 of the CPU and the internal power supply Vint2 of the RAM are connected to the ground GND by turn-off of the switch SW0 and, in addition, the output short function of the regulator circuits VREG and STBY_VREG1. In such an LU holding mode, the state of the up-shifter LU and/or the state of the I/O is held without holding data in the RAM. The state of the up-shifter LU has to be held to prevent the power control circuit PWR_CTL from performing misoperation. Also in the case where the power of the CPU which supplies a signal to the up-shifter LU is interrupted, if power is supplied to the up-shifter LU, the state can be held by the latch function in the up-shifter LU. With respect to the I/O as well, as long as the voltage of the external power supply Vext is supplied, by operating the internal latch function by a control signal ioctrl, the state can be held.

Figure 23:
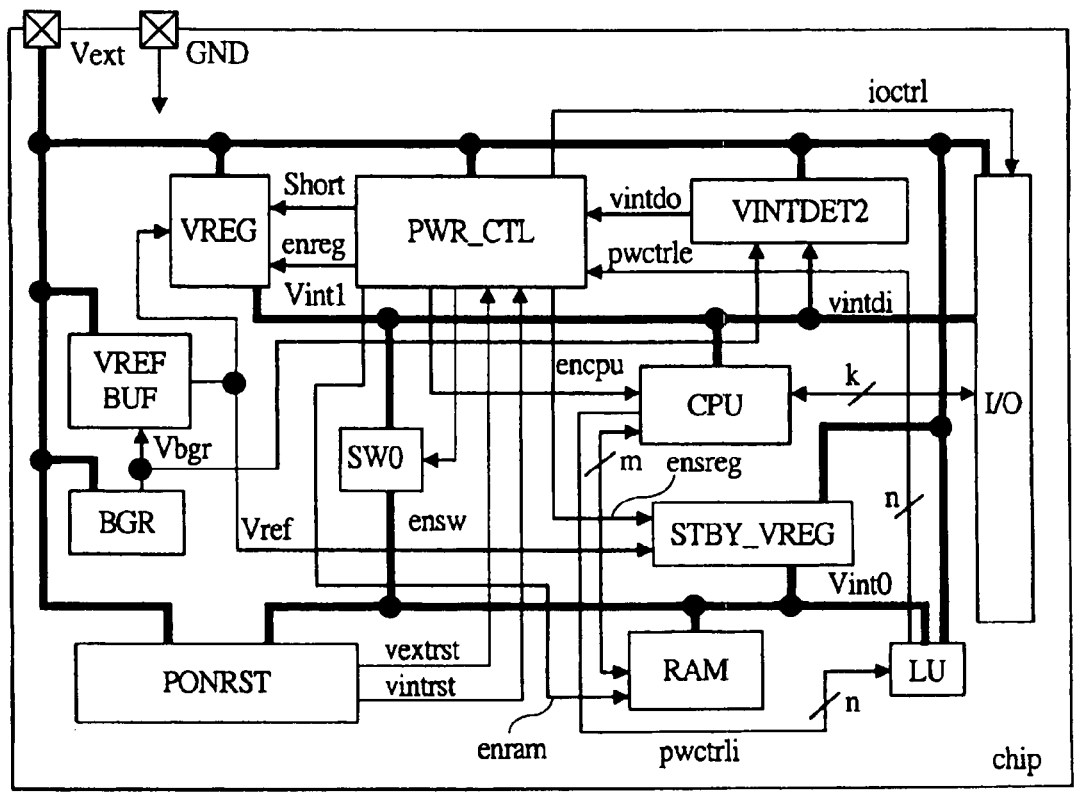
FIG. 23 is a block diagram showing further another example of the configuration of the semiconductor device according to an embodiment of the invention.
Figure 24:
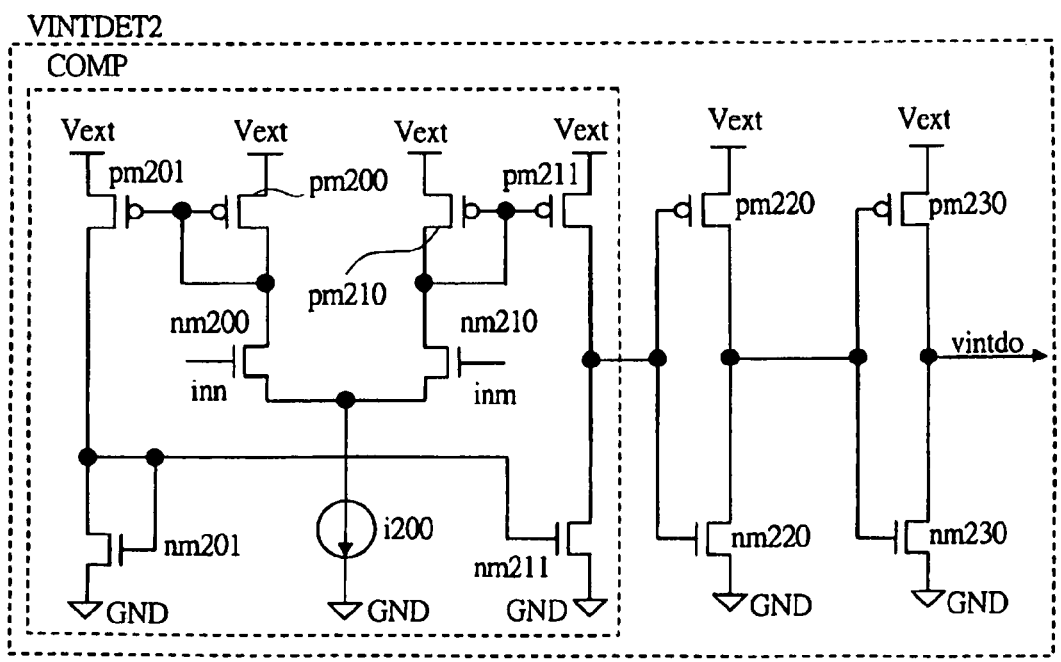
FIG. 24 is a circuit diagram showing an example of the configuration of an internal voltage determining circuit in the semiconductor device of FIG. 23.

FIG. 23 is a block diagram showing further another example of the configuration of the semiconductor device according to the embodiment of the invention. The semiconductor device shown in FIG. 23 is different from the semiconductor device of FIG. 4 with respect to the configuration example (FIG. 10) of the internal voltage determining circuit VINTDET. Specifically, the internal voltage determining circuit VINTDET2 in FIG. 23 receives the output voltage vbgr from the reference voltage generating circuit BGR and has the function of determining the voltage of the internal power supply Vint1 by using the output voltage Vbgr. Such a function can be realized by, concretely, a circuit as shown in FIG. 24. The voltage for determination input to the internal voltage determining circuit VINDET2 is not limited to the output voltage Vbgr of the reference voltage generating circuit BGR but may be a voltage obtained by dividing the output voltage Vref of the internal source voltage setting circuit VREFBUF or an external input determination voltage which is input via a not-shown terminal from the outside.

FIG. 24 is a circuit diagram showing an example of the configuration of the internal voltage determining circuit in the semiconductor device of FIG. 23. The internal voltage determining circuit VINTDET2 of FIG. 24 operates on the voltage of the external power supply Vext and has a comparator COM for comparing voltages of two input terminals "inn" and "inm", and an inverter circuit as a buffer for outputting the comparison result. The comparator COM is constructed by a differential amplifier including MOS transistors and current sources. In such a configuration, the voltage determination level can be arbitrarily set. For example, in the case of connecting the output voltage Vbgr to the input terminal "inn" and connecting the input signal vintdi (Vint1) to the input terminal "inm", whether the power shutdown or reset can be determined at the time point the voltage of the internal power supply Vint1 crosses the voltage level of Vbgr.

Figure 25:
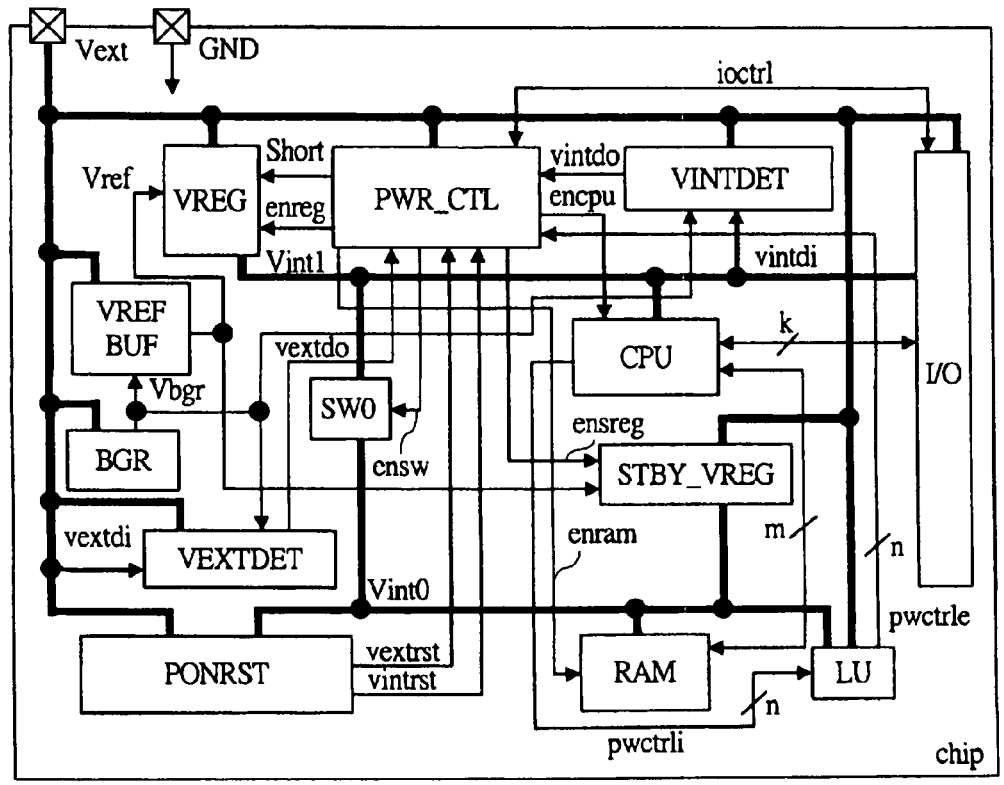
FIG. 25 is a block diagram showing further another example of the configuration of the semiconductor device according to an embodiment of the invention.

FIG. 25 is a block diagram showing further another example of the configuration of a semiconductor device according to an embodiment of the present invention. A semiconductor device shown in FIG. 25 is obtained by adding an external voltage determining circuit VEXTDET to the configuration of FIG. 23. The external voltage determining circuit VEXTDET is mounted in order to forcefully initialize the power-on reset circuit PONRST or the like when the voltage of the external power supply Vext starts decreasing, before the chip performs misoperation due to the decrease. Such a configuration is particularly useful in a chip driven by a battery.

Figure 26:
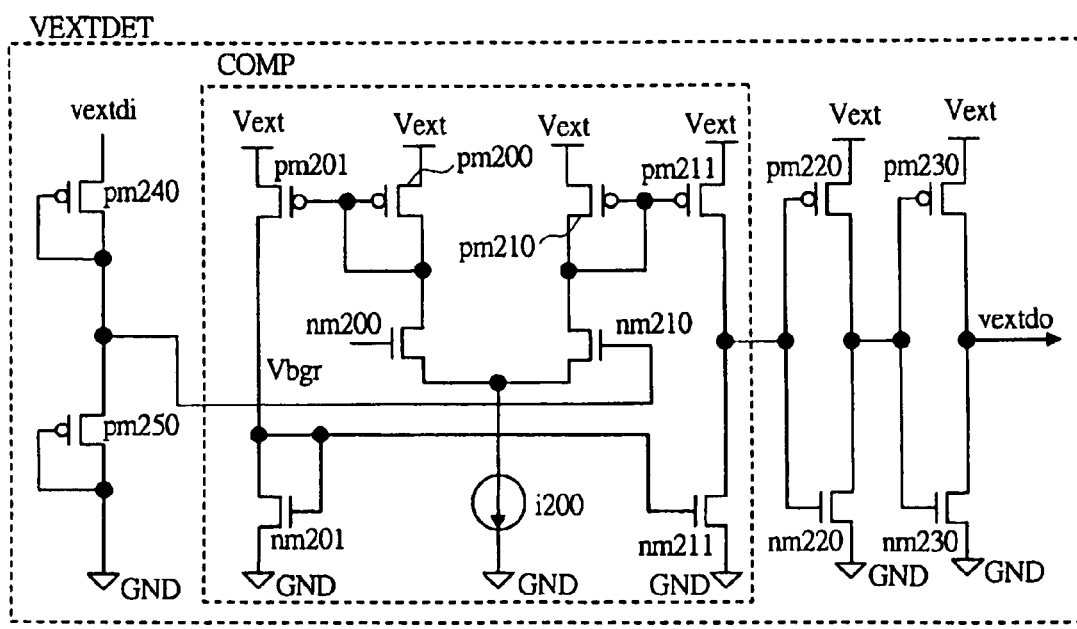
FIG. 26 is a circuit diagram showing an example of the configuration of an external voltage determining circuit in the semiconductor device of FIG. 25.

FIG. 26 is a circuit diagram showing an example of the configuration of an external voltage determining circuit in the semiconductor device of FIG. 25. The external voltage determining circuit VEXTDET has a comparator COM for comparing voltages of two input terminals and an inverter circuit as a buffer for outputting the comparison result. The output voltage Vbgr is applied to one of input terminals of the comparator COM and a voltage obtained by dividing a voltage of vextdi (Vext) into, for example, the half is applied to the other input terminal.

Figure 27:
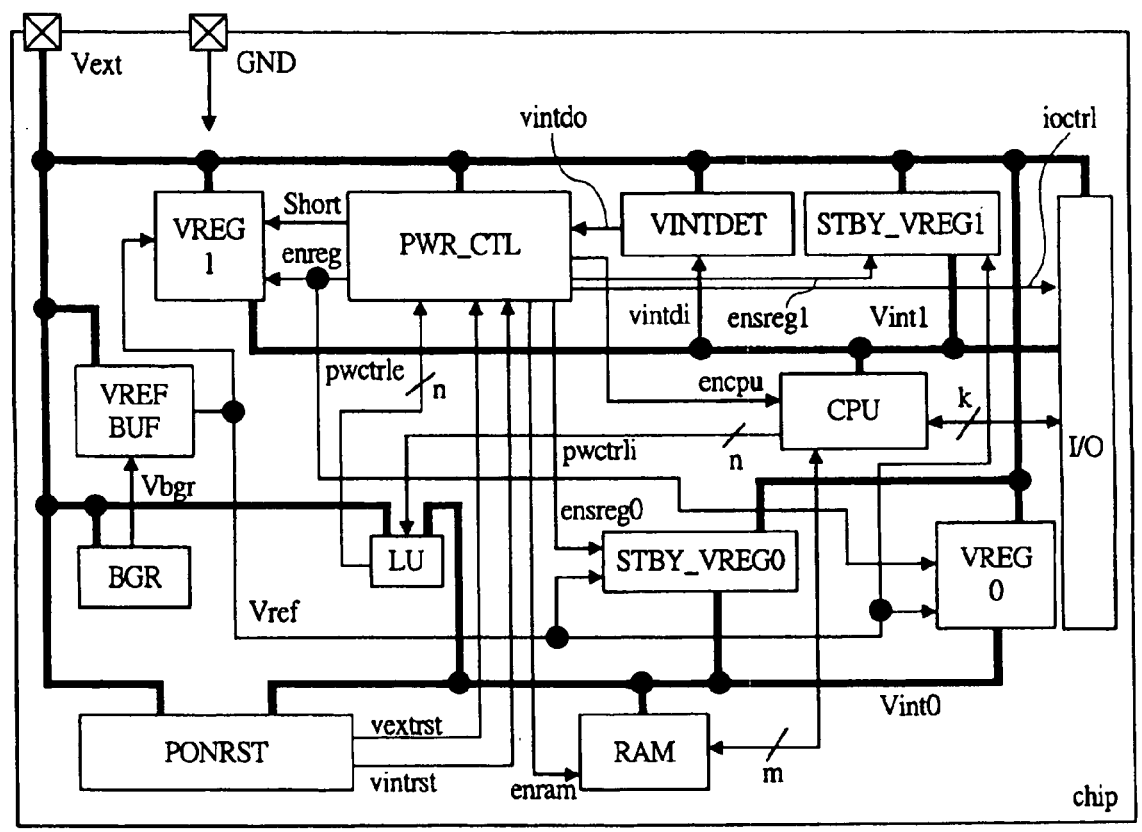
FIG. 27 is a block diagram showing further another example of the configuration of the semiconductor device according to an embodiment of the invention.

FIG. 27 is a block diagram showing further another example of the configuration of a semiconductor device according to an embodiment of the invention. A semiconductor device shown in FIG. 27 is different from the semiconductor device of FIG. 4 with respect to the points that the power switch SW0 does not exist and the internal power supplies Vint0 and Vint1 are completely separated from each other. To the internal power supply Vint0, the regulator circuit VREG0 and the standby regulator circuit STBY_VREG0 are connected. To the internal power supply Vint1, the regulator circuit VREG1 and the standby regulator circuit STBY_VREG1 are connected. At the time of shutting down the power of the internal power supply Vint1, the output short function of the regulator circuit VREG1 is used. On the other hand, the power of the internal power supply Vint0 is not shut down. Consequently, the regulator circuit VREG0 connected to the internal power supply Vint0 does not always have to have the output short function.

In such a configuration, for example, the internal power supplies Vint0 and Vint1 may have internal supply voltages which are different from each other. The internal voltage determining circuit VINTDET connected to the internal power supply Vint1 can be used not only at the time of power shutdown and resetting of the internal power supply Vint1 but also at the time of turn-on of an external power supply. Specifically, at the time of turn-on of an external power supply, the external power supply Vext and the internal power supply Vint0 are determined by the power-on reset circuit PONRST, and the internal power supply Vint1 is determined by the internal voltage determining circuit VINTDET. By computing AND of the two determination results, completion of starting of the external and internal power supplies may be set.

FIG. 28 is a table showing an example of the correspondence relation between the internal modes of the semiconductor device of FIG. 27 and operating states of the internal circuits. In FIG. 28, in addition to the OFF mode, the reset mode, and the normal operation mode, a standby mode (STANDBY) and a RAM holding mode (RAM_HOLD) are provided. In the standby mode, the clock signal and the regulator circuits VREG0 and VREG1 are stopped and power is supplied to the RAM and the CPU by the standby regulator circuits STBY_VREG0 and STBY_VREG1. In the RAM holding mode, the standby regulator circuit STBY_VREG1 which is active in the standby mode is stopped and the output short function of the regulator circuit VREG1 is used, so that the internal power supply Vint1 has the potential which is the same as the ground potential GND, and the CPU is stopped.

Figure 29:
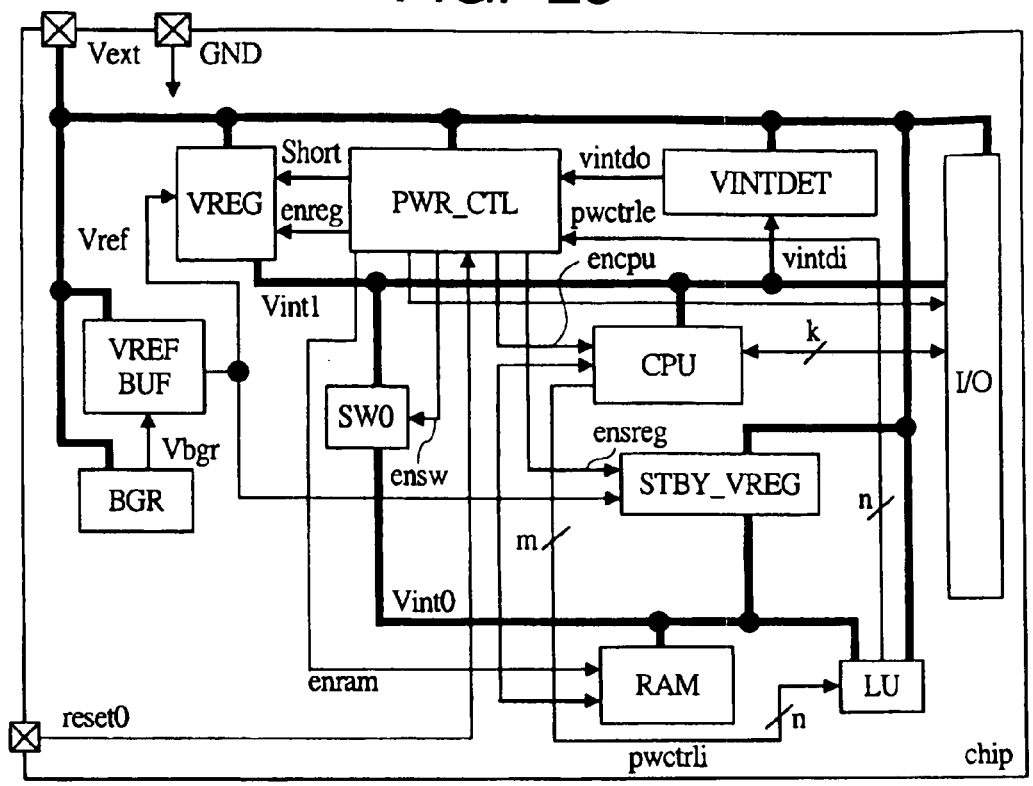
FIG. 29 is a block diagram showing further another example of the configuration of the semiconductor device according to an embodiment of the invention.

FIG. 29 is a block diagram showing further another example of the configuration of the semiconductor device according to the embodiment of the invention. The semiconductor device shown in FIG. 29 has a configuration that, different from the semiconductor device of FIG. 4, the power-on reset circuit PONRST is not provided and a reset period is specified by a reset signal reset0 input from the outside of the chip. Since there is no power-on reset circuit PONRST in the configuration, sufficient caution is necessary to assure the reset period by the reset signal reset0. At the time of power shutdown and resetting of the internal power supply Vint1, in a manner similar to FIG. 4, a sequence control is performed by using a detection signal of the internal voltage determining circuit VITDET connected to the internal power supply Vint1.

Figure 30:
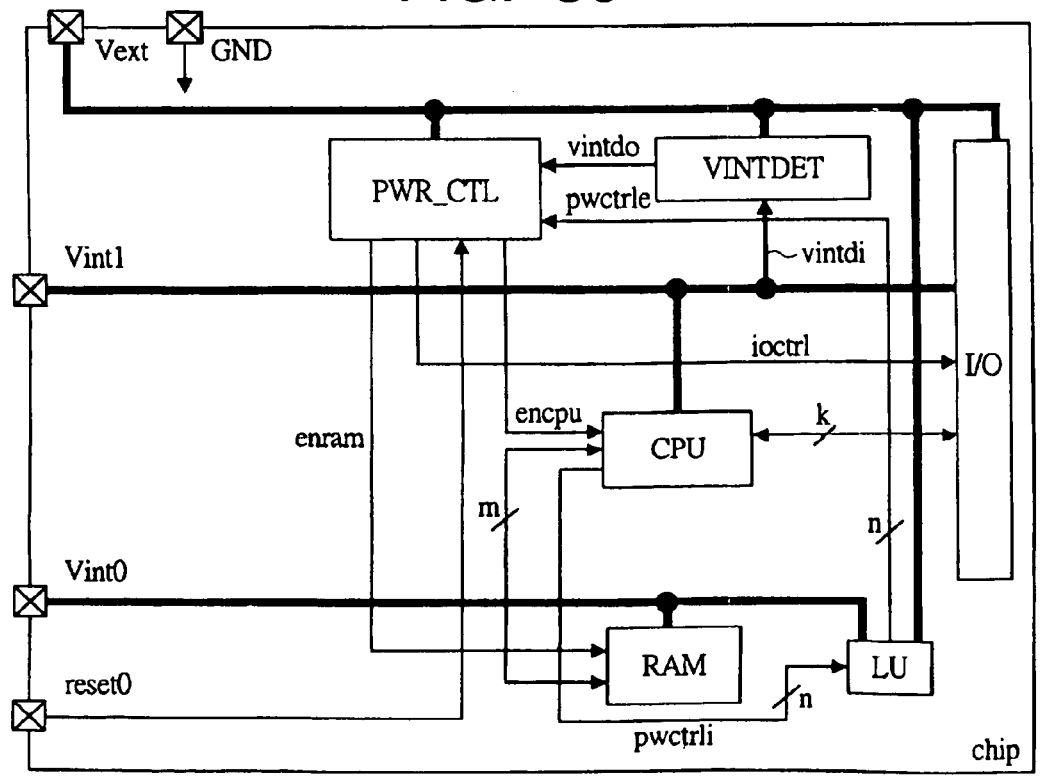
FIG. 30 is a block diagram showing further another example of the configuration of a semiconductor device according to an embodiment of the invention.

FIG. 30 is a block diagram showing further another example of the configuration of the semiconductor device according to an embodiment of the invention. In the semiconductor device of FIG. 30, a regulator circuit is not mounted. The voltages of the external power supply Vext, the internal power supply Vint0 to be held, and the internal power supply Vint1 which is shut down are supplied from the outside of the chip. The power-on reset circuit PONRST is not also mounted. By inputting the reset signal reset0 at the Vext level from the outside of the chip, the CPU, the RAM, and the like have to be reset.

In such a configuration, power shutdown and resetting of the internal power supply Vint1 is controlled by allowing/interrupting the power supply from the outside. At the time of resetting, the internal voltage determining circuit VINTDET connected to the internal power supply Vint1 detects the level of the voltage supplied from the outside to the internal power supply Vint1, and the operation of the CPU and the like connected to the internal power supply Vint1 are resumed.

Figure 31:
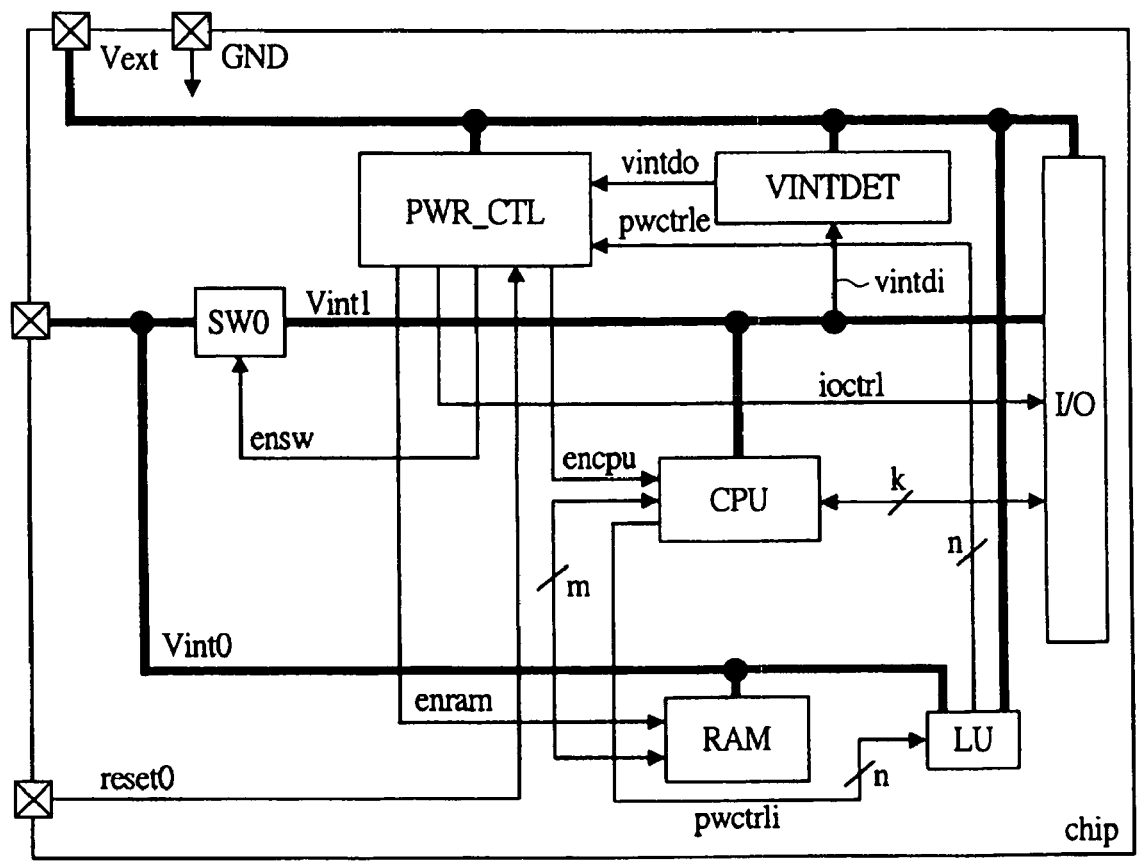
FIG. 31 is a block diagram showing further another example of the configuration of a semiconductor device according to an embodiment of the invention.

FIG. 31 is a block diagram showing further another example of the configuration of the semiconductor device according to an embodiment of the invention. In the semiconductor device of FIG. 31, the voltage of the internal power supply Vint0 is supplied from the outside of the chip, and the voltage of the internal power supply Vint1 is supplied via the power switch SW0 from the internal power supply Vint0. In such a configuration, the internal power supply Vint1 is shut down by turn-off of the switch SW0 and is resumed by turn-on of the switch SW0. The voltage of the internal power supply Vint0 supplied from the outside of the chip is requested to have current supply capability to an extent that voltage fluctuations in the internal power supply Vint0 accompanying the turn-on of the switch SW0 can be sufficiently absorbed. When the internal power supply Vint1 is resumed, the voltage level is detected by the internal voltage determining circuit VINTDET connected to the internal power supply Vint1 and, on the basis of a detection signal, operations of the CPU and the like connected to the internal power supply Vint1 are resumed.

Figure 32:
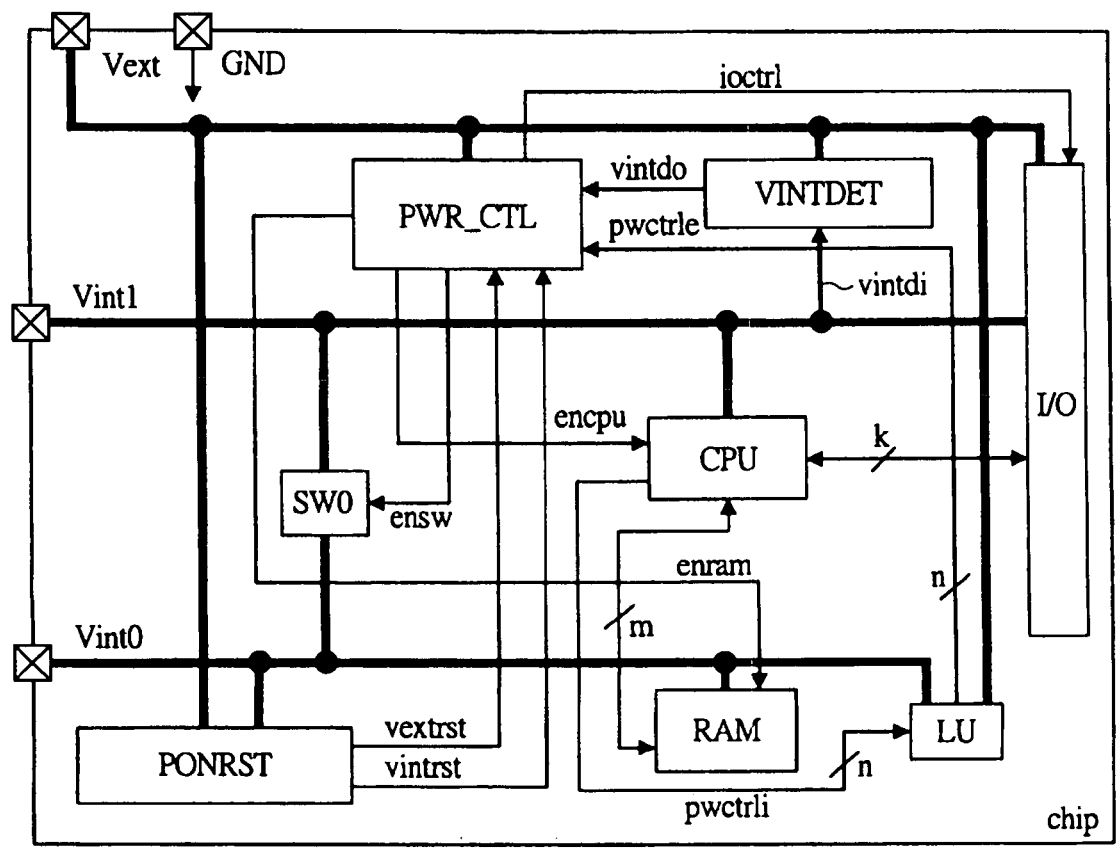
FIG. 32 is a block diagram showing further another example of the configuration of a semiconductor device according to an embodiment of the invention.

FIG. 32 is a block diagram showing further another example of the configuration of the semiconductor device according to an embodiment of the invention. The semiconductor device shown in FIG. 32 is different from the semiconductor device of FIG. 30 with respect to the points that the power-on reset circuit PONRST is mounted and, further, the power switch SW0 is provided between the internal power supplies Vint0 and Vint1. Since the semiconductor device is designed so that the switch SW0 is turned on at the time of power on, the power-on reset signal PONRST detects the voltage levels of both of the internal power supplies Vint0 and Vint1 and generates a reset signal. At the time of resumption of the internal power supply Vint1, the voltage level is detected by the internal voltage determining circuit VINTDET connected to the internal power supply Vint1. On the basis of the detection signal, the operations of the CPU and the like connected to the internal power supply Vint1 are resumed and, further, the switch SW0 is turned on.

Figure 33:
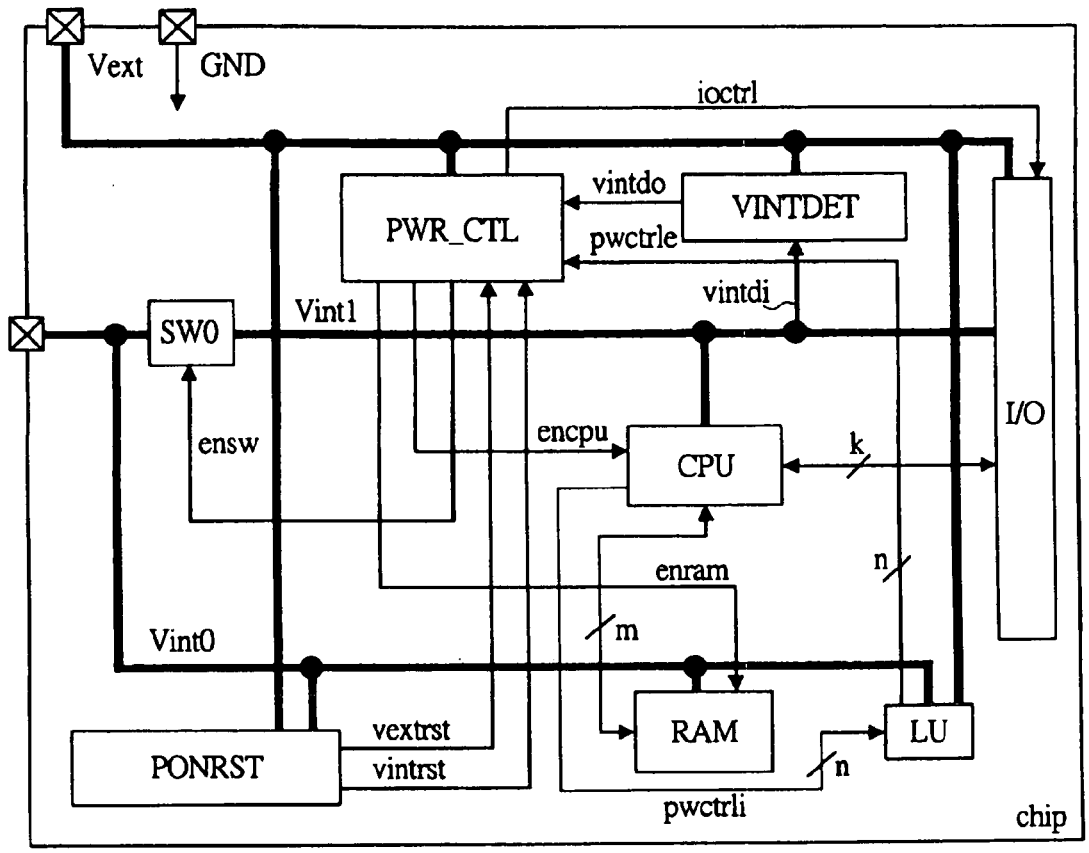
FIG. 33 is a block diagram showing further another example of the configuration of a semiconductor device according to an embodiment of the invention.

FIG. 33 is a block diagram showing further another example of the configuration of the semiconductor device according to an embodiment of the invention. The semiconductor device shown in FIG. 33 has a configuration similar to that of the semiconductor device of FIG. 31 except that the power-on reset circuit PONRST is connected to the external power supply Vext and the internal power supply Vint0. In this case, in a manner similar to FIG. 31, the internal power supply Vint0 supplied from the outside is required to have sufficient supply capability in order to prevent malfunction of the power-on reset circuit PONRST and the like caused by voltage fluctuations in the internal power supply Vint0.

Although the present invention achieved by the inventors herein has been described above concretely on the basis of the embodiments of the invention, obviously, the invention is not limited to the foregoing embodiments but can be variously modified without departing from the gist of the invention.

For example, although a system LSI or a microcomputer formed on a single semiconductor substrate has been described as an example, the invention can be also applied to the configuration of, for example, an SIP (System in Package). Specifically, for example, a CPU chip and a RAM chip, and a chip for supplying power to the CPU and RAM chips and controlling an enable state and the like of the chips are provided, and a power system for the CPU chip among the chips can be provided with a voltage determining circuit.

The semiconductor device of the present invention is a technique effectively applied to a system LSI, a microcomputer, or the like having a power saving mode by power shutdown. The invention is not limited to the above but can be applied to semiconductor products having a power saving mode by power shutdown.

What is claimed is:

1. A semiconductor device comprising:
a first power supply line in which power supply is not interrupted;
a second power supply line in which power supply is interrupted and resumed;
a first circuit to which power is supplied via the second power supply line and, when the power supply is interrupted, which stops operating; and
a voltage determining circuit,
wherein, when the power supply of the second power line is resumed, the voltage determining circuit determines voltage level of the second power supply line, and
wherein the first circuit in the operation stop state shifts to an operation state on the basis of a determination result of the voltage determining circuit.

2. A semiconductor device according to claim 1, further comprising a power switch for connecting the first and second power supply lines.

3. A semiconductor device according to claim 1, wherein the voltage determining circuit is a comparator.

4. A semiconductor device according to claim 2, wherein when power supply to the second power supply line is interrupted, the power switch is turned off, and wherein, when power supply to the second power supply line is resumed, on the basis of a determination result of the voltage determining circuit, the power switch is turned on.

5. A semiconductor device comprising:
an external power supply line to which external power is supplied;
first and second power supply lines;
a first regulator circuit driven by the external power supply line and outputting internal power to the first power supply line;
a second regulator circuit driven by the external power supply line and outputting internal power to the second power supply line;
a unit for interrupting and resuming outputting of the internal power to the second power supply line;
a first circuit to which power is supplied via the second power supply line and, when outputting of the internal power to the second power supply line is interrupted, which enters an operation stop state; and
a voltage determining circuit for determining voltage level of the second power supply line,
wherein, when outputting of the internal power to the second power supply line is resumed, the first circuit in the operation stop state shifts to an operation state on the basis of a determination result of the voltage determining circuit.

6. A semiconductor device according to claim 5, further comprising a power switch for connecting the first and second power supply lines.

7. A semiconductor device according to claim 5, wherein the voltage determining circuit is a comparator driven by the external power supply line.

8. A semiconductor device according to claim 5, wherein the voltage determining circuit includes a circuit driven by the external power supply line and shifting voltage level of the internal power to voltage level of the external power and makes voltage determination depending on whether the shifting circuit operates normally or not.

9. A semiconductor device according to claim 6, wherein the unit for interrupting and resuming outputting of the internal power to the second power supply line is realized by:
a function of stopping operation of the second regulator circuit; and
a function of shorting an output of the second regulator circuit to a ground potential by a switch.

10. A semiconductor device according to claim 6, wherein the first regulator circuit has current supplying capability lower than that in the second regulator circuit.

11. A semiconductor device according to claim 6, wherein a power-on reset circuit for detecting voltage levels of the external power supply line and the first power supply line at turn-on of the external power supply, and generating a reset signal for various circuits, is connected to the external power supply line and the first power supply line.

12. A semiconductor device according to claim 9, wherein, at the time of interrupting outputting of internal power to the second power supply line, first, the power switch is turned off and the first circuit is set to an operation stop state and, next, a process of stopping operation of the second regulator circuit and shorting an output to a reference power supply voltage is performed, and wherein, at the time of resuming outputting of the internal power to the second power supply line, first, shorting of an output of the second regulator circuit is cancelled and operation is started and, next, a process of making the first circuit shift to an operation state by using a determination result of the voltage determining circuit as a trigger and turning on the power switch is performed.

13. A semiconductor device comprising:
an external power supply line to which external power is supplied;
a first power supply line in which power supply is not interrupted;
a plurality of second power supply lines to each of which power supply can be selectively interrupted or resumed;
a plurality of power switches for connecting the first power supply line and the plurality of second power supply lines to each other; and
a voltage determining circuit for determining voltage level of each of the plurality of second power supply lines,
wherein power is supplied to the first power supply line by a first regulator circuit driven by the external power supply line,
wherein power is supplied to each of the plurality of second power supply lines from second regulator circuits provided for the plurality of second power supply lines and driven by the external power supply line,
wherein a state of each output of the second regulator circuit is set and a desired power switch in the plurality of power switches is turned off, thereby selecting a power supply line in which power supply is interrupted from the plurality of second power supply lines, and
wherein, at the time of resuming the power line in which power supply is interrupted, the desired power switch is turned on by using a determination result of the voltage determining circuit as a trigger.

14. A semiconductor device according to claim 13, wherein a nonvolatile memory is connected to one of the plurality of second power supply lines.

15. A semiconductor device comprising:
an external power supply line to which external power is supplied;
first and second regulator circuits connected to the external power supply line and capable of generating internal power;
a first internal power supply line to which an output of the first regulator circuit is connected;
a second internal power supply line to which an output of the second regulator circuit is connected; and
a power switch for connecting the first and second internal power supply lines,
wherein a voltage detection circuit is further provided, which can detect level of a voltage supplied to the second internal power supply line when the power switch is in an off state and the first and second internal power supply lines are controlled not to be connected.

16. A semiconductor device according to claim 15, wherein the semiconductor device has a first operation mode and a second operation mode, wherein, in the first operation mode, the power switch is turned on to connect the first and second internal power supply lines, and the first regulator circuit is made operative, wherein, in the second operation mode, the second regulator circuit is made non-operating, and wherein, at the time of shift from the second operation mode to the first operation mode, the second regulator circuit starts operating, and the voltage detection circuit detects the voltage level.

* * * * *